United States Patent
Stockhammer et al.

(10) Patent No.: US 10,270,823 B2
(45) Date of Patent: Apr. 23, 2019

(54) LOW LATENCY VIDEO STREAMING

(71) Applicant: QUALCOMM Incorporated, San Diego, CA (US)

(72) Inventors: Thomas Stockhammer, Bergen (DE); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 505 days.

(21) Appl. No.: 15/019,804

(22) Filed: Feb. 9, 2016

(65) Prior Publication Data

US 2016/0234536 A1 Aug. 11, 2016

Related U.S. Application Data

(60) Provisional application No. 62/114,423, filed on Feb. 10, 2015, provisional application No. 62/183,054, filed on Jun. 22, 2015.

(51) Int. Cl.
| | |
|---|---|
| *H04L 29/06* | (2006.01) |
| *H04L 29/08* | (2006.01) |
| *H04N 21/44* | (2011.01) |
| *H04N 21/262* | (2011.01) |
| *H04N 21/266* | (2011.01) |
| *H04N 21/438* | (2011.01) |
| *H04N 21/845* | (2011.01) |

(Continued)

(52) U.S. Cl.
CPC ........ *H04L 65/4076* (2013.01); *H04L 65/607* (2013.01); *H04L 67/02* (2013.01); *H04N 21/26258* (2013.01); *H04N 21/4384* (2013.01); *H04N 21/8455* (2013.01); *H04N 21/8456* (2013.01); *H04N 21/85406* (2013.01); *H04N 21/234327* (2013.01); *H04N 21/26616* (2013.01); *H04N 21/44016* (2013.01)

(58) Field of Classification Search
USPC ......................................... 709/231, 203, 200
See application file for complete search history.

(56) References Cited

U.S. PATENT DOCUMENTS

2011/0317760 A1  12/2011  Chen et al.
2012/0016965 A1  1/2012  Chen et al.
(Continued)

OTHER PUBLICATIONS

International Preliminary Report on Patentability issued in International Application No. PCT/US2016/017325 dated May 12, 2017, 11 pp.
(Continued)

*Primary Examiner* — El Hadji M Sall
(74) *Attorney, Agent, or Firm* — Shumaker & Sieffert, P.A.

(57) ABSTRACT

A client device includes one or more processors configured to determine, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, determine, from the manifest file, a segment of the representation conforming to the type that provides the point at which to begin retrieving data from the representation, and retrieve the determined segment from the representation.

40 Claims, 16 Drawing Sheets

(51) Int. Cl.
H04N 21/854 (2011.01)
H04N 21/2343 (2011.01)

(56) References Cited

U.S. PATENT DOCUMENTS

2013/0091251 A1 4/2013 Walker et al.
2015/0026358 A1* 1/2015 Zhang .................. H04L 65/601
709/231

OTHER PUBLICATIONS

"Text of ISO/IEC CD 23001-6 Dynamic Adaptive Streaming over HTTP," MPEG Meeting; Oct. 11-15, 2010; Guangzhou; Motion Picture expert Group or ISO/IEC JTC1/SC29/WG11, No. N11578, Oct. 21, 2010, XP030018073, ISSN: 0000-0009, 70 pp.
Fernando et al., "Data Format and Delivery of Side Information for DASH Streaming of MPEG-2 TS Media," MPEG Meeting; Jan. 24-28, 2011; Daegu; Motion Picture Expert Group or ISO/IEC JTC1/SC29/WG11, No. m18733, Nov. 25, 2010, XP030047303, 6 pp.
Giladi, "Integrated Text for 23009-3," MPEG Meeting; Mar. 3-Apr. 4, 2014; Valencia; Motion Picture Expert Group or ISO/IEC JTC1/SC29/WG11, No. m33470, Mar. 30, 2014, XP030061921, pp. 2-10 and pp. 43-45.
International Search Report and Written Opinion dated Jun. 6, 2016 from International Application No. PCT/US2016/017325.
Stockhammer, "SISSI Solution Proposal," MPEG Meeting; Jun. 22-26, 2015; Warsaw; Motion Picture Expert Group or ISO/IEC JTC1/SC29/WG11, No. m36598, Jun. 23, 2015, XP030064966, 15 pp.
Wang et al., "EE#6: Trick Mode and Random Access Signaling (TRA)," MPEG Meeting; Oct. 11-15, 2010; Guangzhou; Motion Picture Expert Group or ISO/IEC JTC1/SC29/WG11, No. M18016, Oct. 11, 2010, XP030046606, 31 pp.
Zhao et al., "Response for EE#5: Indexing Information and its Carriage for MPEG-2 TS," MPEG Meeting; Jan. 24-28, 2011; Daegu; Motion Picture Expert Group or ISO/IEC JTC1/SC29/WG11, No. m18734, Nov. 25, 2010, XP030047304, 6 pp.
Reply to Written Opinion dated Jun. 6, 2016 from International Application No. PCT/U2016/017325 dated Oct. 7, 2016, 6 pp.
Second Written Opinion of International Application No. PCT/U2016/017325, dated Jan. 2, 2017, 8 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
ITU-T H..262, Transmission of Non-Telephone Signals, Information Technology—Generic Coding of Moving Pictures and Associated Audio Information: Video, The International Telecommunication Union: Jul. 1995, 211 pp.
CCITT H..261, Line Transmission of Non-Telephone Signals, Video Codec for Audiovisual Service at p ×64 kbit/s, The International Telecommunication Union: Geneva, 1990, 32 pp.
Fielding et al., "Hypertext Transfer Protocol—HTTP/1.1", Network Working Group, IETF, Jun. 1999, Retrieved from the Internet on May 5, 2010 from http://www.ietf.org/rfc/rfc2616.txt, 165 pp.
3rd Generation Partnership Project; Technical Specification Group Services and System Aspects; Transparent end-to-end packet switched streaming service (PSS); 3GPP file format (3GP) (Release 12) V12.2.0, Dec. 2013, 61 pp.
Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26. 247 version 10.0.0 Release 10), Jun. 2011, 96 pp.
3rd Generation Partnership Project; Technical Specification Group Services and System Aspects; Transparent end-to-end packet switched streaming service (PSS); 3GPP file format (3GP) (Release 9) V9.1.0, Mar. 2010, 55 pp.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12) V.12.1.0, Dec. 2013, 118 pp.
Information technology—MPEG systems technologies—Part 6: Dynamic adaptive streaming over HTTP (DASH), ISO/IEC JTC 1/SC 29/WG 11, ISO/IEC FCD 23001-6, Jan. 28, 2011, 86 pp.
Information technology—Dynamic adaptive streaming over HTTP (DASH)—Part 1: Media presentation description and segment formats, Amendment 4: Segment Independent SAP Signalling (SISSI), MPD chaining, MPD reset and other extensions, ISO/IEC JTC 1/S 29/WG 11, ISO/IEC 23009-1:2014PDAM 4, Oct. 23, 2015, 17 pp.
Wenger et al., "RTP Payload Format for H.264 Video", Network Working Group, RFC 3984, Feb. 2005, Retrieved from the Internet on Jan. 6, 2010 from http://tools.ietf.org/html/rfc3984, 84 pp.
Stockhammer et al, WD 0.1 of 23001-6 Dynamic Adaptive Streaming over HTTP(DASH), International Organisation for Standardisation Organisation Internationale De Normalisation, ISO/IEC JTC1/SC9/WG11, Coding of Moving Pictures and Audio, MPEG 2010, Geneva, M11398, Jan. 19, 2017.

* cited by examiner

LOW LATENCY VIDEO STREAMING

This application claims the benefit of U.S. Provisional Application No. 62/114,423, filed Feb. 10, 2015, and U.S. Provisional Application No. 62/183,054, filed Jun. 22, 2015, the entire contents of each of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques that may be used to achieve low latency video (and/or other media data) streaming. For example, media content may include a variety of representations that act as alternatives to each other. In accordance with the techniques of this disclosure, one representation may include relatively frequent stream access points (SAPs), while another, alternative representation may include relatively infrequent SAPs. A manifest file (such as a media presentation description (MPD) of Dynamic Adaptive Streaming over HTTP (DASH)) may signal types of segments (or formats to which segments conform), as well as locations of such segments (or relative frequencies at which such segments occur in a corresponding representation. A client device may use the manifest file to determine one of the representations having relatively frequent SAPs, and then retrieve segments or portions of segments from that representation until a SAP is available from a different, target representation. The target representation may have a relatively higher quality due to having fewer (that is, less frequent) SAPs. In some examples, the different representations may be available via different retrieval mechanisms, such as unicast or broadcast. For instance, the initial representation may be available via unicast, while the target representation may be available via broadcast.

In one example, a method includes determining, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, determining, from the manifest file, a segment of the representation conforming to the type that provides the point at which to begin retrieving data from the representation, and retrieving the determined segment from the representation.

In another example, a client device for retrieving media data includes one or more processors configured to determine, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, determine, from the manifest file, a segment of the representation conforming to the type that provides the point at which to begin retrieving data from the representation, and retrieve the determined segment from the representation.

In another example, a client device for retrieving media data includes means for determining, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, means for determining, from the manifest file, a segment of the representation conforming to the type that provides the point at which to begin retrieving data from the representation, and means for retrieving the determined segment from the representation.

In another example, a computer-readable storage medium has stored thereon instructions that, when executed, cause a processor to determine, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, determine, from the manifest file, a segment of the representation conforming to the type that provides the point at which to begin retrieving data from the representation, and retrieve the determined segment from the representation.

In another example, a method of signaling media information includes constructing a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, sending the manifest file to a client device, and in response to a request from the client device for the segment conforming to the type that provides the point at which to begin retrieving data from the representation, sending the segment that provides the point at which to begin retrieving data from the representation to the client device.

In another example, a server device for signaling media information includes one or more processors configured to construct a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, send the manifest file to a client device, and, in response to a request from the client device for the segment conforming to the type that provides the point at which to begin retrieving data from the representation, send the segment that provides the point at which to begin retrieving data from the representation to the client device.

In another example, a server device for signaling media information includes means for constructing a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, means for sending the manifest file to a client device, and means for sending the segment that provides the point at which to begin retrieving data from the representation to the client device in response to a request from the client device for the segment conforming to the type that provides the point at which to begin retrieving data from the representation.

In another example, a computer-readable storage medium has stored thereon instructions that, when executed, cause a processor of a server device to construct a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, send the manifest file to a client device, and send the segment that provides the point at which to begin retrieving data from the representation to the client device in response to a request from the client device for the segment conforming to the type that provides the point at which to begin retrieving data from the representation.

The details of one or more examples are set forth in the accompanying drawings and the description below. Other features, objects, and advantages will be apparent from the description and drawings, and from the claims.

DETAILED DESCRIPTION

Figure 1:
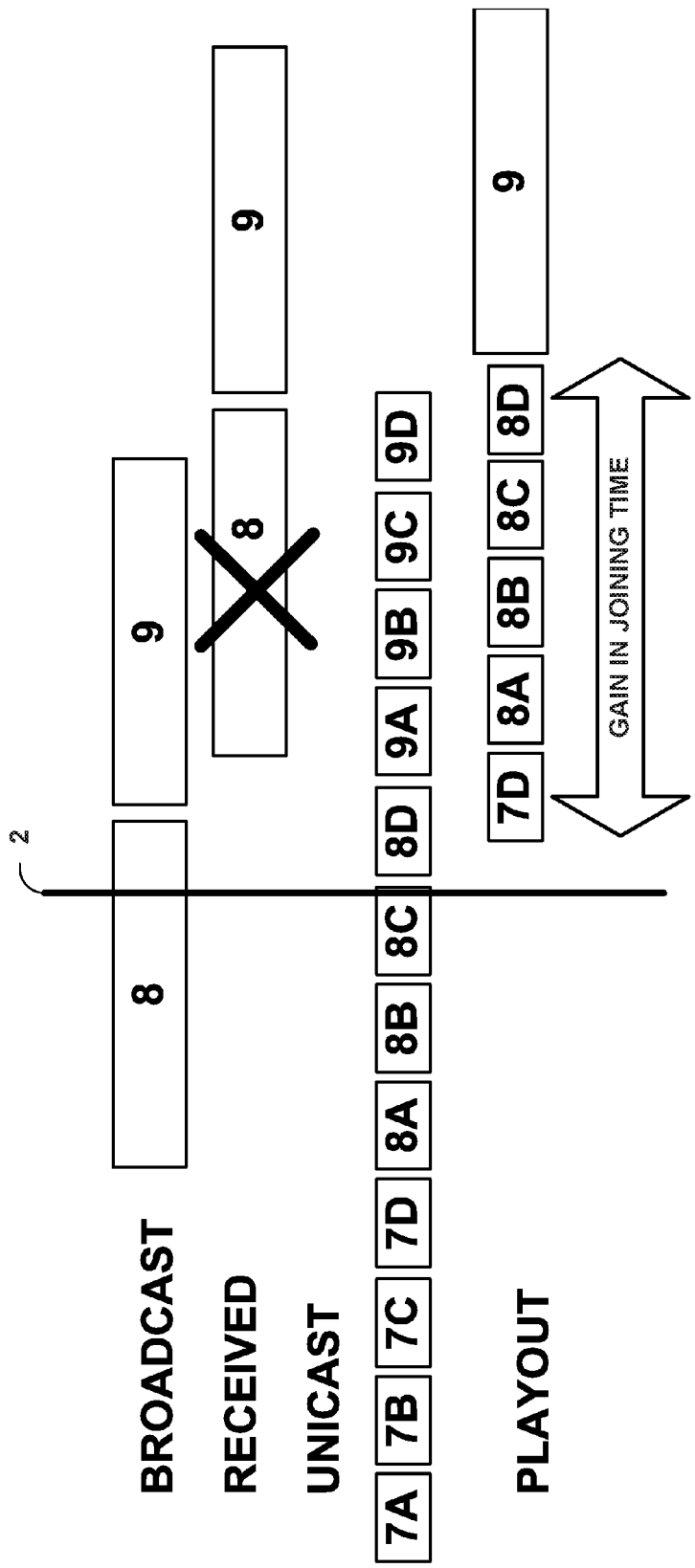
FIG. 1 is a conceptual diagram illustrating an example use case for quickly joining a stream.

In general, this disclosure describes techniques for low-latency video streaming based on, e.g., media content formatted according to the ISO base media file format (ISOB-MFF) and dynamic adaptive streaming over HTTP (DASH). DASH is described in, e.g., 3rd Generation Partnership Project; Technical Specification Group Services and System Aspects; Transparent end-to-end packet switched streaming service (PSS); 3GPP file format (3GP) (Release 12) V12.2.0, December 2013. This disclosure describes various methods for defining and signalling of data which may conform to a new DASH profile (e.g., advanced live profile) and some new types of media segments that may enable low latency video streaming, including reduced channel acquisition and channel change times in broadcast and multicast, while potentially enabling high-efficiency video coding structures at the same time.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

Random access refers to decoding of a video bitstream starting from a coded picture that is not the first coded picture in the bitstream. Random access to a bitstream may be used in many video applications, such as broadcasting and streaming, e.g., for users to tune-in to a program anytime, to switch between different channels, to jump to specific parts of the video, or to switching to a different bitstream for stream adaptation (of the bit rate, frame rate, spatial resolution, and so on). This feature may be enabled by inserting random access pictures or random access points, many times in regular intervals, into the video bitstream.

Bitstream splicing refers to the concatenation of two or more bitstreams or parts thereof. For example, a first bitstream may be appended by a second bitstream, possibly with some modifications to either one or both of the bitstreams to generate a spliced bitstream. The first coded picture in the second bitstream is also referred to as the splicing point. Therefore, pictures following the splicing point in the spliced bitstream originate from the second bitstream, while pictures preceding the splicing point in the spliced bitstream originate from the first bitstream.

Splicing of bitstreams may be performed by bitstream splicers. Bitstream splicers are often lightweight and much less intelligent than encoders. For example, bitstream splicers might not be equipped with entropy decoding and encoding capabilities.

Bitstream switching may be used in adaptive streaming environments. A bitstream switching operation, performed at a certain picture in the switched-to bitstream, is effectively a bitstream splicing operation in which the splicing point is the bitstream switching point, i.e., the first picture from the switched-to bitstream. Separate representations may also be referred to as (or provide) respective bitstreams.

Instantaneous decoding refresh (IDR) pictures, as specified in ITU-T H.264/AVC (Advanced Video Coding) or High Efficiency Video Coding (HEVC), can be used for random access. However, since pictures following an IDR picture in decoding order cannot use pictures decoded prior to the IDR picture for reference (for inter-picture prediction), bitstreams relying on IDR pictures for random access can have significantly lower coding efficiency.

To improve coding efficiency, the concept of clean random access (CRA) pictures was introduced in HEVC to allow pictures that follow a CRA picture in decoding order but precede it in output order to use pictures decoded before the CRA picture as reference. Pictures that follow a CRA picture in decoding order but precede the CRA picture in output order are referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be non-decodable when random access from the CRA picture occurs. Hence, the leading pictures are typically discarded during random access decoding. To prevent error propagation from reference pictures that may not be available depending on where the decoding starts, all pictures that follow a CRA picture both in decoding order and output order shall not use any picture that precedes the CRA picture either in decoding order or output order (which includes the leading pictures) as reference.

The concept of broken link access (BLA) picture was further introduced in HEVC after the introduction of CRA pictures and is based on the concept of CRA pictures. A BLA picture typically originates from bitstream splicing at the position of a CRA picture, and in the spliced bitstream the splicing point CRA picture is changed to a BLA picture.

IDR pictures, CRA pictures, and BLA pictures are collectively referred to as random access point (RAP) pictures. IDR pictures correspond to the so-called closed group of pictures (GOP) based RAPs, while CRA and BLA pictures correspond to the conventionally so-called open group of pictures (GOP) based RAPs.

One difference between BLA pictures and CRA pictures is as follows. For a CRA picture, the associated leading pictures are correctly decodable if the decoding starts from a RAP picture before the CRA picture in decoding order, and may be non-correctly-decodable when random access from the CRA picture occurs (i.e., when the decoding starts from the CRA picture, or in other words, when the CRA picture is the first picture in the bitstream). For a BLA picture, the associated leading pictures may be non-decodable in all cases, even when the decoding starts from a RAP picture before the BLA picture in decoding order.

File format standards include ISO base media file format (ISOBMFF, ISO/IEC 14496-12) and other derived from the ISOBMFF, including MPEG-4 file format (ISO/IEC 14496-14), 3GPP file format (3GPP TS 26.244) and AVC file format (ISO/IEC 14496-15).

The ISOBMFF is used as the basis for many codec encapsulation formats, such as the AVC file format, as well as for many multimedia container formats, such as the MPEG-4 file format, the 3GPP file format (3GP), and the DVB file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is the elementary syntax structure in the ISOBMFF, including a four-character coded box type, the byte count of the box, and the payload. An ISOBMFF file consists of a sequence of boxes, and boxes may contain other boxes. A Movie box ("moov") contains the metadata for the continuous media streams present in the file, each one represented in the file as a track. The metadata for a track is enclosed in a Track box ("trak"), while the media content of a track is either enclosed in a Media Data box ("mdat") or directly in a separate file. The media content for tracks consists of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g., for progressive download or DASH. For streaming purposes, the movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

The techniques of this disclosure may be applied to video files conforming to video data encapsulated according to any of ISOBMFF, Scalable Video Coding (SVC) file format, Advanced Video Coding (AVC) file format, Third Generation Partnership Project (3GPP) file format, and/or Multiview Video Coding (MVC) file format, or other similar video file formats.

ISO/IEC 23001-7 defines common encryption for the ISO base media file format. In the case of this standard, the encryption is based on the elementary stream. In addition, the standard allows AES-128 CTR and CBC mode. In order to decrypt the media at a random access point, all DRM related information is required, including protection scheme specific information as well initialization vectors.

Dynamic adaptive streaming over HTTP (DASH), specified in ISO/IEC 23009-1, is a standard for HTTP (adaptive) streaming applications. It mainly specifies the format of the media presentation description (MPD), also generally referred to as a manifest file, and the media segment format. The MPD describes the media available on the server and lets the DASH client to autonomously download the media version at the media time it is interested in.

An example procedure for DASH based HTTP streaming includes the following steps:

1) A client obtains the MPD of a streaming content, e.g., a movie. The MPD includes information on different alternative representations, e.g., bit rate, video resolution, frame rate, audio language, of the streaming content, as well as the URLs of the HTTP resources (the initialization segment and the media segments).
2) Based on information in the MPD and the client's local information, e.g., network bandwidth, decoding/display capabilities and user preference, the client requests the desired representation(s), one segment (or a part thereof) at a time.
3) When the client detects a network bandwidth change, the client requests segments of a different representation with a better-matching bitrate, ideally starting from a segment that starts with a random access point.

During an HTTP streaming "session," to respond to a user request to seek backward to a past position or forward to a future position, the client requests past or future segments starting from a segment that is close to the desired position and that ideally starts with a random access point. The user may also request to fast-forward the content, which may be realized by requesting data sufficiently for decoding only the intra-coded video pictures or only a temporal subset of the video stream.

The latest ISOBMFF specification specifies six types of Stream Access Points (SAPs) for use with DASH. The first two SAP types (types 1 and 2), correspond to IDR pictures in H.264/AVC and HEVC. The third SAP type (type 3) corresponds to open-GOP random access points hence BLA or CRA pictures in HEVC.

In HTTP streaming, e.g., according to DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first media segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Various problems may arise in conventional DASH techniques. For example, for low-latency video streaming services, such as distributing a low-latency live service, it is relevant that each segment can be generated as quickly as possible to be made available on the origin server. In other words, short segments are necessary in such scenarios. Currently, there are two options for creating short segments:
1) Use the ISOBMFF live profile: This means that each segment must start with a SAP of type 1 or 2, but segments must all be of the same duration in one Adaptation Set. In other words, IDR pictures have to be used to provide RAPs, open-GOP RAPs, which correspond to SAP type 3, cannot be used. Consequently, video coding efficiency has to be compromised.
2) Use the ISOBMFF main profile: However, this means that no MPD-based signaling on switch points (SAP type 1 or 2) is possible and the client needs to parse the segments in order to find out how to access the sample.

In addition, a segment overloading problem may arise. That is, in the core DASH specification, segments are delivery units that must include an integral number of movie fragments. Without loss of generality, assume that a segment contains a single movie fragment. Movie fragments themselves only have constraints in terms of providing an integral number of samples in decoding order.

In core DASH, segments may be generated for the purpose of creating addressable and deliverable units without further restrictions. However, in restricted profiles (e.g., the ISO live profile), segments at the same time are used for enabling representation switching. The latter adds significant restrictions:
Each segment must start with a closed GOP
segments must not overlap in presentation time within one representation These two restrictions result in reduced coding efficiency, especially if segments are relatively short.

Furthermore, for broadcast applications, random access into a delivery unit is relevant. The duration of segments determine the random access time which is relevant for channel acquisition and channel change. For random access, a more efficient open GOP is sufficient, and segments may even have a presentation time overlap to some extent, which may result in a reduced playout quality at access (some dropped frames), but still allow fast access to the stream.

The techniques of this disclosure, as discussed below, may address the different functional aspects of a segment and differentiate segments into different classes.

FIG. 1 is a conceptual diagram illustrating an example use case for quickly joining a stream. In this example, some segments are available via broadcast, while other segments are available via unicast. In particular, segments labeled "8" and "9" are available via broadcast, while segments labeled 7A-7D, 8A-8D, and 9A-9D are available via unicast. In this use case, a client device retrieves segments 7D and 8A-8D via unicast (where segments 8A-8D include the same media data as segment 8 available via broadcast), and then receives segment 9 via broadcast. In particular, the client device tunes into the broadcast at tune-in time 2, which is during transmission of segment 8 via broadcast. Therefore, the client device cannot receive segment 8 via broadcast, so instead, the client device retrieves segments 7D and 8A-8D, before receiving segment 9 via broadcast. Thus, the client device switches from broadcast to unicast after retrieving segment 8D. Accordingly, when playing out media data, the client device plays out media data from segments 7D and 8A-8D (received via unicast), then switches to playout from segment 9 (received via broadcast).

This use case demonstrates "fast tune-in" with unicast. In this case, a service provider would like to distribute one representation that has high SAP frequency (typically, type 3 is possible) in order for quick access. However, after tune-in, the client would like to switch to a representation that is more efficient and that has less IDR frames. The switched-to representation may even have a different segment size. This scenario may be the case in unicast, but also in a hybrid case. The scenario is shown in FIG. 1. In this diagram, shorter segments are made available via unicast, each segment including an IDR frame. If a client joins a program at a certain time and without the unicast support, it will take some time until the segment is received and can be started to be played (segment 9 in FIG. 1). This is due to the fact that the whole segment needs to be received (in order to properly initialize, e.g., a media decoder to decode media data of the segment).

In this case, a unicast representation is offered with a quarter of the segment duration. The client can immediately choose to playout the unicast short segments until the efficient (long segment, long IDR frame distance) broadcast representation arrives via broadcast. Signaling of these capabilities (position of random access points and switch points) in the MPD is relevant, but not possible today.

Another, similar use case involves fast tune-in with SHVC. There may be an offering of a base layer with low RAP frequency and even low segment size, and an enhancement layer that has larger GOP frequency. Then the same should be achieved as discussed with respect to FIG. 1. Signaling these features is not possible today.

Another desirable use case is use of an efficient time-shift buffer. In certain cases, a representation may be offered at the live edge with small segments, but as soon as the client moves to time-shift buffer, the segment size increases. The representations should still be in one adaptation set to express seamless switching capabilities, but they should not be forced to have the same segment sizes and/or the same switch point/random access point frequency. The same applies for recording of a live event for future on-demand use.

Another use case involves fast tune-in with open GOPs. An open GOP may generally correspond to a GOP including pictures that can be predicted relative to pictures outside the GOP. This is in contrast to a closed GOP, which is self-contained, in that all pictures of the GOP are predicted from other pictures within the GOP. For example, an open GOP may start with an inter-predicted picture (or an inter-predicted key frame), while a closed GOP may start with an intra-predicted picture.

The case of fast tune-in with open GOPs may be a typical case for a broadcast fast tune-in. The issue is that there are cases for which one wants to tune-in quickly, switch across Representations, and possibly provide low latency. This may result in complex use cases for signaling, namely signaling segments, open GOPs, closed GOPs, segment alignments, and so on.

Another use case involves fast switch down for continuity. This case may also be typical for a broadcast fast tune-in scenario. The issue is that there are cases for which one wants to tune-in quickly, switch across Representations, and possibly provide low latency. This may result in complex use cases for signaling, namely signaling segments, open GOPs, closed GOPs, segment alignments, and so on.

Another use case involves segment availabilities. In order to reduce latencies, not only do the segments need to be short, but also the time between generation of the segments and the publication needs to be short. To avoid HTTP 404 errors, the segment availability times need to be available (e.g., signaled) to the receiver. Segment templates provide a pattern to announce availability times, but this requires that segments are available at an exact time, and therefore, variations in segment durations need to be taken into account when announcing the segment availability start times and the encoder needs to follow this pattern. If the content provider is not forced to generate an IDR frame with segment availability times, it can more easily vary IDR frame placements and segment availability times can be announced more accurately. This aspect should be considered in signaling segment durations.

In different use cases, the different features of switching, delivery, and random access are more or less relevant, but they may need to be provided within one content offering. Several scenarios exist that should be considered:
  Deployment of a broadcast distribution with low channel acquisition time together with the ability to switch to a unicast representation at a lower frequency.
  Delivering a low latency version at the live edge over unicast that syncs with broadcast.
  Delivering a low latency version over broadcast only with longer random access frequency than the delivery units.
  Variable segment durations that need to be taken into account.

The techniques of this disclosure may allow these various use cases, alone or in any combination, and may overcome any or all of the problems discussed above.

Figure 2:
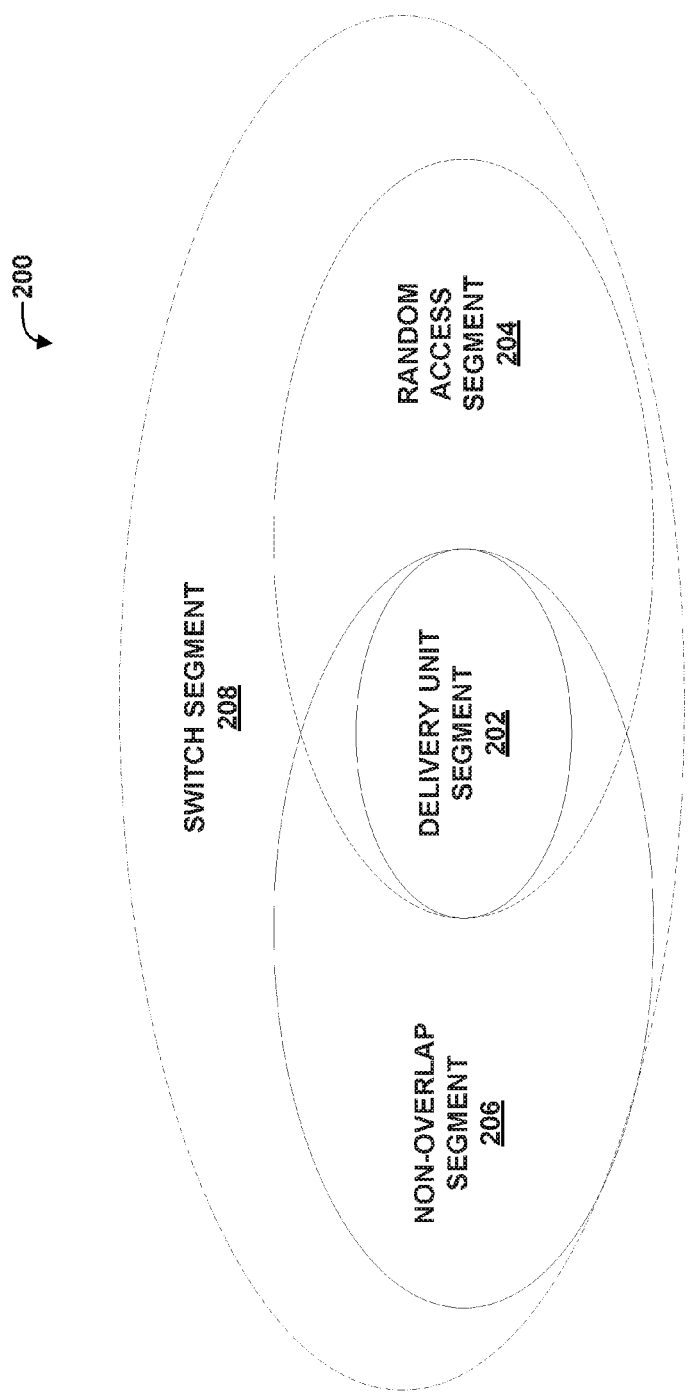
FIG. 2 is a Venn diagram illustrating relationships between various types of media segments.

FIG. 2 is a Venn diagram 200 illustrating relationships between various types of media segments. Media segments may be used for any or all of various purposes in DASH, such as the following:
  Representation Switching
    Closed GOPs are generally necessary.
    Segments must not overlap in time within one Representation.
    Segments must be aligned across different Representations in one Adaptation Set.
  Random Access
    Open GOP is generally necessary.
    Segments may overlap in time within one representation if open GOP random access is permitted.
  Delivery unit
    No requirements on Random Access or Switching.
    Segment must include an integral number of movie fragments.

In order to address different aspects, four different segment types (or formats) may be considered according to FIG. 2:
  Delivery Unit Segment Format 202: Only a fragment without any constraints. (Represented by an ellipse with a solid outline in FIG. 2).
  Random Access Segment Format 204: Open GOP for tuning in. (Represented by an ellipse with a dashed outline in FIG. 2).
  Non-Overlap Segment Format 206: A client device can switch to a segment of this format without any problems. (Represented by an ellipse with a dotted outline in FIG. 2.)
  Switch Segment Format 208: A client device can switch into a segment of this format. (Represented by an ellipse with a double-dotted dashed outline in FIG. 2.)

Figure 3:
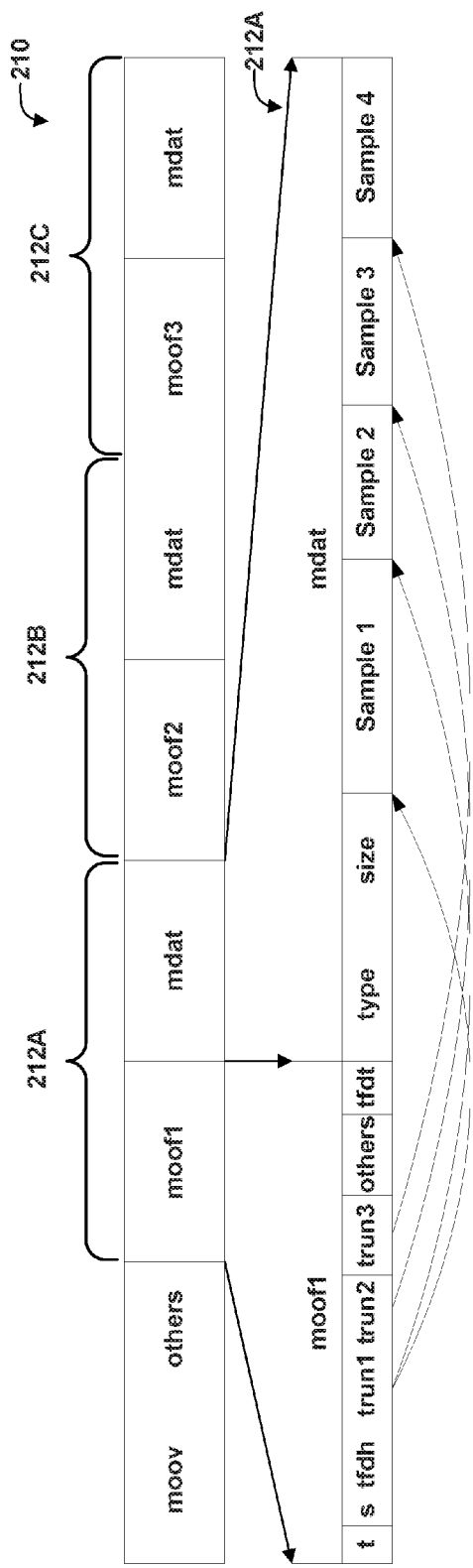
FIG. 3 is a conceptual diagram illustrating an example structure of a Representation and an ISO base media file format (BMFF) file.

FIG. 3 is a conceptual diagram illustrating an example structure of a Representation 210 and ISO BMFF files 212A-212C. FIG. 3 also shows an exploded view of ISO BMFF file 212A, which includes a moof (movie fragment) box and a movie data (mdat) box. The example ISO BMFF file 212A of FIG. 3 is conceptually similar to movie fragments 164 of FIG. 6, described in greater detail below. It is relevant to consider that movie fragments are the delivery units for media data. Movie fragments are generated such that they contain a sequence of a moof box and an mdat box, e.g., as shown in FIG. 3.

Figure 4:
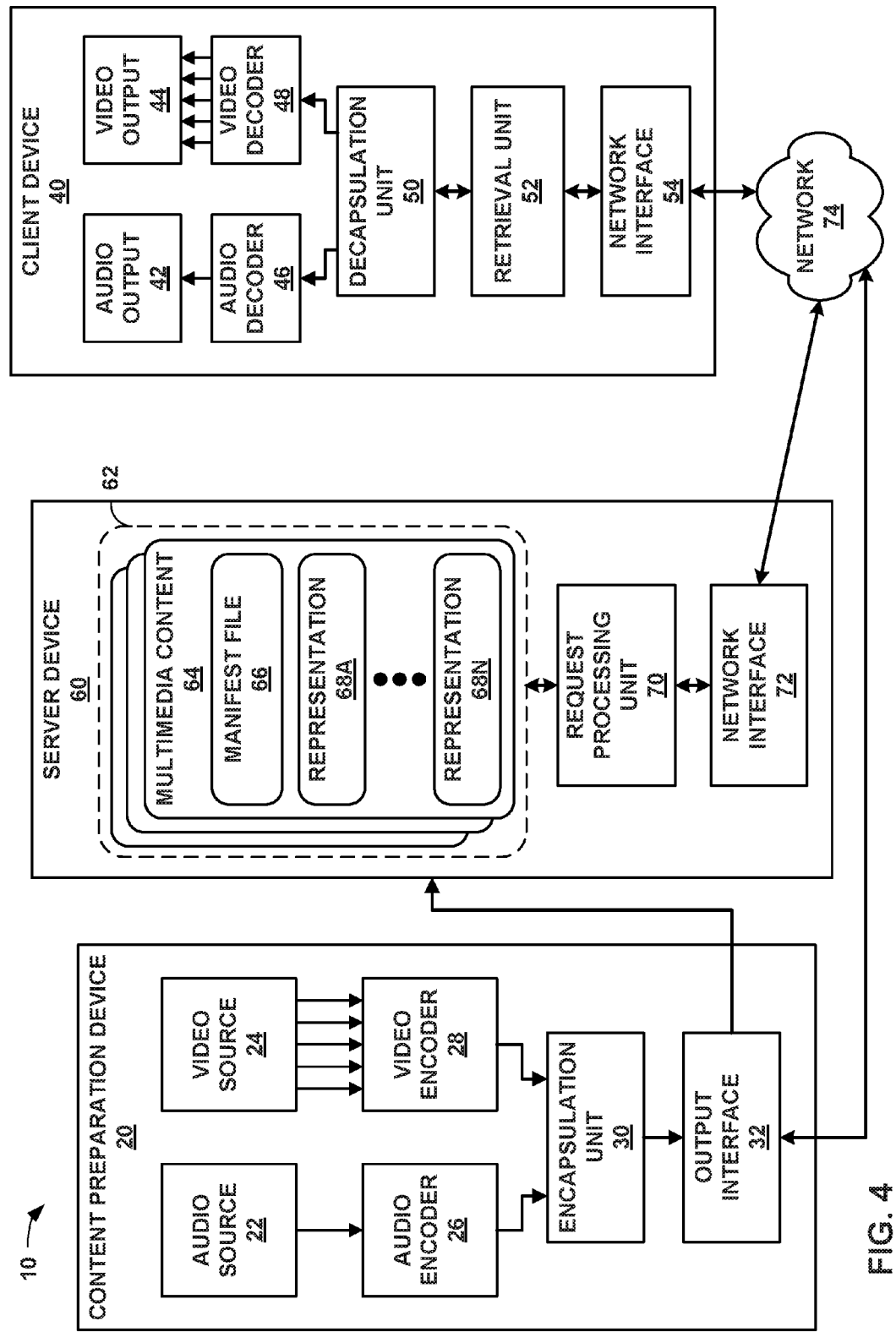
FIG. 4 is a block diagram illustrating an example system that implements techniques for streaming media data over a network.

FIG. 4 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 4, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and High Efficiency Video Coding (HEVC), define the syntax, semantics, and decoding processes for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 4, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 4, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 4, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, manifest file 66 may signal various segment formats to which segments may conform (also referred to herein as types of segments). Manifest file 66 may also signal locations of segments that conform to each format (that is, locations of each of the various types of segments). For example, manifest file 66 may signal frequencies at which each of the various types of segments occur in each of representations 68.

Using manifest file 66, client device 40 may achieve a low latency playback of media data. For example, one of representations 68 (e.g., representation 68A) may include SAPs at a relatively high frequency, as indicated by manifest file 66, while another of representations 68 (e.g., representation 68N) may include SAPs at a relatively low frequency. In particular, the SAPs may form part of segments conforming to particular formats, e.g., random access media segment format and/or switching media segment format. Furthermore, representations 68 may be available for retrieval via different transmission services. For example, representation 68A may be available via unicast, while representation 68N may be available via broadcast.

In accordance with some examples of the techniques of this disclosure, client device 40 may determine, per the example above, that representation 68A includes a relatively high frequency of SAPs (e.g., highly frequent random access media segments and/or highly frequent switching media segments), as indicated by manifest file 66. Furthermore, client device 40 may determine that representation 68N includes a relatively low frequency of SAPs, but also has a relatively higher quality. Thus, to initiate media data retrieval, client device 40 may begin by retrieving media segments from representation 68A, until client device 40 can switch to representation 68N, e.g., at a random access media segment or a switching media segment of 68N, as indicated by manifest file 66. Various detailed use cases describing examples of these techniques are described below with respect to, e.g., FIGS. 7-14.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, any or all of content preparation device 20, server device 60, and/or client device 40 may be configured to perform various methods for defining, signaling, and/or processing media data according to a new DASH profile (e.g., advanced live profile). Likewise, any or all of these devices may be configured to process new types of media segments, which may enable latency video streaming, including reduced channel change time in broadcast and multicast, while enabling high-efficiency video coding structures at the same time. In general, the following aspects are discussed, which may be performed alone or in any combination:

Defining different media segment types and their structures.
Review of current attributes.
Solution Considerations.
MPD Signalling.
Signaling the type in the segment.
Signaling the type in the MPD.
Enabling Adaptation Sets for different use cases.

In some examples, content preparation device 20, server device 60, and client device 40 may be configured to utilize media segments conforming to any of the following formats: a delivery unit media segment format, a random access media segment format, a no overlap segment format, and/or a switching media segment format. These formats are described in greater detail below.

A media segment conforming to the Delivery Unit Media segment Format may be defined as follows:

Each media segment shall contain one or more whole self-contained movie fragments. A whole, self-contained movie fragment is a movie fragment ('moof') box and a media data ('mdat') box that contains all the media samples that do not use external data references referenced by the track runs in the movie fragment box.
Each 'moof' box shall contain at least one track fragment.
The 'moof' boxes shall not use external data references, the flag 'default-base-is-moof' shall be set, and data-offset shall be used, i.e., 'base-data-offset-present' shall not be used. This combination of settings may be referred to as movie-fragment relative addressing for media data.
Each media segment may carry 'dums' in the segment Type box ('styp') as a compatible brand. The conformance requirements of this brand may be as defined in this disclosure.

A media segment conforming to the Random Access Media segment Format is defined as follows:

The media segment shall conform to the Delivery Unit Media segment format as specified above.
The first access unit in each movie fragment in a Random Access Media segment shall correspond to the $I_{SAU}$ of a SAP of type 1, 2, or 3 (e.g., include an IDR, CRA, or BLA picture).
The media segment shall carry sufficient information to access the media in the stream, e.g., all necessary encryption in combination with the Initialization Segment, if available.
Each 'traf' box (track fragment box) shall contain a 'tfdt' box (track fragment decode time box).
Each media segment may carry 'rams' in the segment Type box ('styp') as a compatible brand. The conformance requirements of this brand are defined in this subclause.

Each media segment may contain one or more 'sidx' boxes. If present, the first 'sidx' box shall be placed before any 'moof' box and the first segment Index box shall document the entire segment.

A media segment conforming to No Overlap segment Format may be defined as follows:

The media segment shall conform to the Delivery Unit Media segment format as specified above.
The segment shall fulfil the non-overlap property as defined in 4.5.3 of ISO/IEC 23009-1, in the sense that the segment and its preceding segment fulfil the non-overlap property.

A media segment conforming to the Switching Media segment Format may be defined as follows:

The media segment shall conform to the Random Access Media segment format as specified above.
The first sample in the first movie fragment in a Switching Media segment shall correspond to the $I_{SAU}$ of a SAP of type 1 or 2 (e.g., an IDR picture).
Each media segment may carry 'swms' in the segment Type box ('styp') as a compatible brand. The conformance requirements of this brand are defined in this subclause.

Segments of the various formats may perform different functions. For example, delivery unit media segments generally perform the function of delivering media data. As another data, random access media segments perform the function of providing random access points (including initialization data) to a representation including the random access media segments. No overlap segments may perform the function of indicating segment alignment between representations, which may enable simple representation switching. Switching media segments provide the function of allowing representation switching, without including extra initialization data that would be required for a random access media segment.

Furthermore, content preparation device 20, server device 60, and client device 40 may be configured to process data representing the formats discussed above and/or other data according to the techniques of this disclosure, e.g., in manifest file 66 (such as an MPD). The following features may be signaled in manifest file 66, alone or in any combination:

The type of each media segment in the representation, either explicitly signaled or signaled through a pattern.
The ability to have different segment sizes in one Adaptation Set, but still have aligned switching points, i.e., Switching Media segments starting at the same time.
The consequences for the computation of minBufferTime and bandwidth (should be starting at a random access point)

For each of representations 68, and possibly at a defaulted Adaptation Set level, the following may be signaled in manifest file 66:

Pattern in representation:
Every segment is of type Delivery Unit Media segment, every N-th segment is a Random Access Media segment, every M-th is a Switching segment with M>=N. Some abbreviation and defaulting may be doable.
This can be signaled with new attribute—rams-frequency and swms-frequency.
Other abbreviation patterns that allow expression of the pattern without updating the MPD.
Pattern in segment Timeline
Add an optional type field in the segment Timeline for each element.

segment-type.

The Type field may also express a pattern as the pattern above.

Enable to signal irregularities with updates of the S element in the segment Timeline.

Explicit

Add a field that allows signaling segment patterns in an explicit list, possibly alternating with some patterns. This may also include signaling of segment duration.

It may be the case that representations in a common adaptation set have different segment durations. However, the issue for switching is that the switch points across representations need to be aligned in order to enable seamless switching. The position of the switch points may be signaled as discussed above. The following signaling may also be considered:

All representations have switch points at the same position and they are aligned. This can be signaled with a single flag.

When a switch point is signaled at a specific time (in this case, MPD time, which may be complex), then this is aligned with all other switch points in the representation. This can also be signaled with a single flag and the same flag may be used as discussed above.

In some examples, even in case there is no Switching Media segment following, there is still no overlap, such that client device 40 can switch from a no-overlap point to a Switching Media segment.

Other more explicit signaling of switch points may additionally be signaled in manifest file 66.

As noted above, in some examples, content preparation device 20, server device 60, and/or client device 40 may be configured to utilize an advanced live profile of DASH. The advanced live profile may include all features and segment Types defined above. The advanced live profile may be identified by the uniform resource name (URN): "urn:mpeg:dash:profile:advanced-live:2015".

In some examples, if the advanced live profile is used in an adaptation set:

Every Switching Media segments shall carry swms' in the segment Type box ('styp') as a compatible brand.

Every Random Access Media segments that does not carry swms' shall carry 'rams' in the segment Type box ('styp') as a compatible brand.

This disclosure recognizes the following issues and limitations for conventional signaling for MPD attributes:

1. Signalling of Segment Availability Time:
   either @duration or Segment Timeline:
      Proposal is to simplify in the new profile and only use Segment Timeline for this purpose as it is a superset of @duration.
      However, Segment Timeline is more complex as it permits exceptions.
      We also need to make clear if the time in the Segment Timeline is an exact segment duration (permits less flexibility in content authoring) or a drift-free duration and only signals the segment availability times.
      Important to note that by the proper application of @timescale, this issue may be solved.

2. Signalling of switch from property, i.e., no overlap
   By segment alignment being set to true in an Adaptation Set.
      Issue is that this means that each segment needs to have the same duration.
      The no-overlap needs to be expressed on a finer granularity.

3. Signalling of Random Access
   Starts with SAP is set to 1, 2 or 3:
      Issue is that this is not very explicitly stated.
      Also other requirements must be set, see extended definition of random access segment.

4. Signalling of Switch Point.
   Starts with SAP is set to 1 or 2:
      Issue is that this is not very explicitly stated.
      Other type of switching may be applied, but this would require more thoughts. Some flexibility should be added.

5. Signalling of Segment URL
   Number based Template
      Issue is that basically there is an assumption that each segment has the same number in each Representation in each Adaptation Set. Note that this is no requirement, but likely assumed in implementations. If you change to have different sizes of segments in one Adaptation Set, the there is no longer a numbering correspondence.
      For simplicity for now, numbers are not used.
   Time based Template
      Issue is that basically there is an assumption that each segment has the same time in each Representation in each Adaptation Set. Note that this is no requirement, but likely assumed in implementations.
      However, also note that this can be expressed on a common timeline. And timeline is more suitable than numbering to express the relationship across different Representations.
   List of Segments
      Issue is that here the list position aligns segments and it may the case that the naming is arbitrary. The client needs to maintain the exact mapping of list and order of each Representation in an Adaptation Set.

This disclosure techniques for assigning different pieces as needed. Server device 60 and client device 40 may be configured according to the following approach, in some examples:

The duration/segment timeline is assigned to the Delivery Unit, as it expresses the time when the segment is available at the server.

The time may not be accurate in terms of media time, but is used to compute the segment availability start time.

This timing can be different for different Representation in one Adaptation Set. For example there may be Representations that are available with more Delivery Units than others. See use case discussion.

Clear instructions on how to compute the Segment Availability Start Time based on the above signals are needed. The existing model is effective, but it practitioners should be sure to properly use the existing model, if the existing model for segment availability start time computation is to be used in accordance with the techniques of this disclosure.

This includes that the segment availability time may be adjusted for certain Representations or baseURLs by the availability time offset.

Another important issue to clarify is, how irregular Segments durations affect the availability start time and signaling. Generally, segments should be of the same size.

The Random Access can be different in different Representations.

It needs to be clarified if Random Access is timing wise only at the start of a segment or if it could also be in the middle of a segment.

According to 4.2.2 it is currently at the start of a segment, but this may result in irregular segment sizes if random access points are irregularly placed.

This again affects the latency as the segment availability is less predictable.

However, as a working assumption the 4.2.2 model should be maintained that Random Access is at the start of a segment.

Random Access may be signaled in two domains, in time or in segment numbering.

To come to a common tool, a time-based approach may be used.

At least two switching approaches were discussed in the core experiments:

Bitstream switching:
  The DASH client is unaware of the internal structures of Representations. It only knows where it can splice Representations and feeds this to the media decoder as a single bitstream. The encoder makes sure that the Representations are encoded such that this property is fulfilled on encapsulation and media stream level.
  This would basically permit to the client to create a sequence/bitstream as follows:
  Init Segment for the Adaptation Set
  Media Segment 1 of Representation 1
  . . .
  Media Segment X of Representation 1
  Media Segment X+1 of Representation 2
  . . .

The switching is enabled by specific properties in the media. This is what was done in DASH. Some rules on how switching can be done on a file playout level were created. The basic rule is that you know that if segment alignment is set to true, start with SAP is 1 or 2 the following sequence provides a seamless switch:
  Init Segment representation 1
  Media Segment 1 of Representation 1
  . . .
  Media Segment X of Representation 1
  Init Segment representation 2
Media Segment X+1 of Representation 2
  Switching at open GOP or other aspects that require a more detailed understanding of the a media processing.

Extensions and restrictions may be applied to manifest file 66 (e.g., an MPD) based on the discussion above, where the extensions and restrictions may apply to new tools). For example, the following extensions may be applied, alone or in any combination:

Add a new attribute @randomAccessPeriod (or any other means to express the random access Period) which is expressed at the scale of the @timescale on Representation level. Any segment for which the $Time$ falls to an integer multiple of the product of @timescale and @randomAccessPeriod is a random access segment, i.e., it permits to access the Adaptation Set this Representation.

The random access may be qualified further, for example what SAP type is available at what Period, i.e., SAP type 1, 2 or 3. Note that 3 would mean that the experienced SAP type may also be 1 or 2.

Add a new element Switching Media Segment (or any other means to express switching) with two attributes on Adaptation Set level (one or more might be present):
  @period expressing in the scale of the @timescale. Any time position for which the $Time$ falls to an integer multiple of the product of @timescale and provides a switch-to opportunity, i.e., it permits to switch to this Representation.
  @type expressing the type of switching is enabled. At least two types are defined, namely bitstream switching and media level switching. Other types may be defined, such as open GOP switching.
  Another way to express such switching would be to use descriptor type were the descriptor expresses the type of switching and the value the switching frequency.

In the segment timeline and the S element, provide an additional attribute @reset, which is by default set to false. A reset means that the periodicity of the random access period and the switching period is reset at this point. This allows that IDR are added and the segment timeline is basically reset at more arbitrary times.

The above scenario does not necessarily support the use case in which segment templates provide segment availabilities discussed above. In order to also address this use case, the following extension may be added:

Add a new element Switching (or any other means or element to express switching) with two attributes on Representation level (one or more might be present):
  @period expressing in the scale of the @timescale. Any time position for which the $Time$ falls to an integer multiple of the product of @timescale and provides a switch-to opportunity, i.e., it permits to switch to this Representation.
  @type expressing the type of switching is enabled. At least two types are defined, namely bitstream switching and media level switching. Other types may be defined, such as open GOP switching.

The following restrictions are proposed to apply for the advanced live profile in order to enable the more advanced use cases:
  Use a single @timescale for all Representations in one Adaptation Set.
  Use Segment Timeline for signaling of segment durations (for simplicity).
    Only use $Time$ for the signaling of the URL (for simplicity now).
    The timing on the Segment duration is accurate (working assumption, we need to understand the consequences).
      The accuracy of the segment duration can be controlled by the @timescale in use (Note), for example if the timescale is only ⅕th of the actually sampling rate, you have some flexibility on the exact sampling rate.
    The segment timeline is per Representation to allow different segment durations in different Representations. However, it may be defaulted on Adaptation Set level.
    The segment timeline may use open ended @r (−1) or closed @r (>=0).
  Segment alignment and start with SAP may be used for backward compatible deployments, but should generally not be used. The signaling must always be provided by the @randomAccessPeriod and Switching element.

It needs to be ensured that if an Adaptation Set contains one than more Representations that a switching logic is provided for the Representation on Adaptation Set level.

Although primarily described with respect to DASH, the techniques of this disclosure may also be used for other media formats, such as MPEG-2 TS (transport stream), or WebM.

In this manner, client device 40 represents an example of a device for retrieving media data comprising one or more processors configured to retrieve a media segment conforming to at least one of a delivery unit media segment format, a random access media segment format, a no overlap segment format, or a switching media segment format, and process the media segment based at least in part on whether the media segment conforms to the delivery unit media segment format, the random access media segment format, the no overlap segment format, or the switching media segment format.

Client device 40 also represents an example of a device for retrieving media data comprising one or more processors configured to receive a manifest file including data indicating a pattern for media segments of various types in a representation, and retrieve one or more of the media segments based at least in part on the pattern.

Moreover, client device 40 represents an example of a device for retrieving media data comprising one or more processors configured to determine, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, determine, from the manifest file, a segment of the representation conforming to the type that provides the point at which to begin retrieving data from the representation, and retrieve the determined segment from the representation.

Similarly, server device 60 and content preparation device 20 represent examples of a device for sending media data, the device comprising one or more processors configured to form a media segment conforming to at least one of a delivery unit media segment format, a random access media segment format, a no overlap segment format, or a switching media segment format, and send the media segment to a client device.

Server device 60 and content preparation device 20 also represent examples of a device for sending media data, the device comprising one or more processors configured to send a manifest file including data indicating a pattern for media segments of various types in a representation to a client device, and send, in response to one or more requests, one or more of the media segments based at least in part on the pattern to the client device.

Server device 60 and content preparation device 20 also represent examples of a device for signaling media information, the device including one or more processors configured to construct a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, send the manifest file to a client device, and, in response to a request from the client device for the segment conforming to the type that provides the point at which to begin retrieving data from the representation, send the segment that provides the point at which to begin retrieving data from the representation to the client device.

Figure 5A:
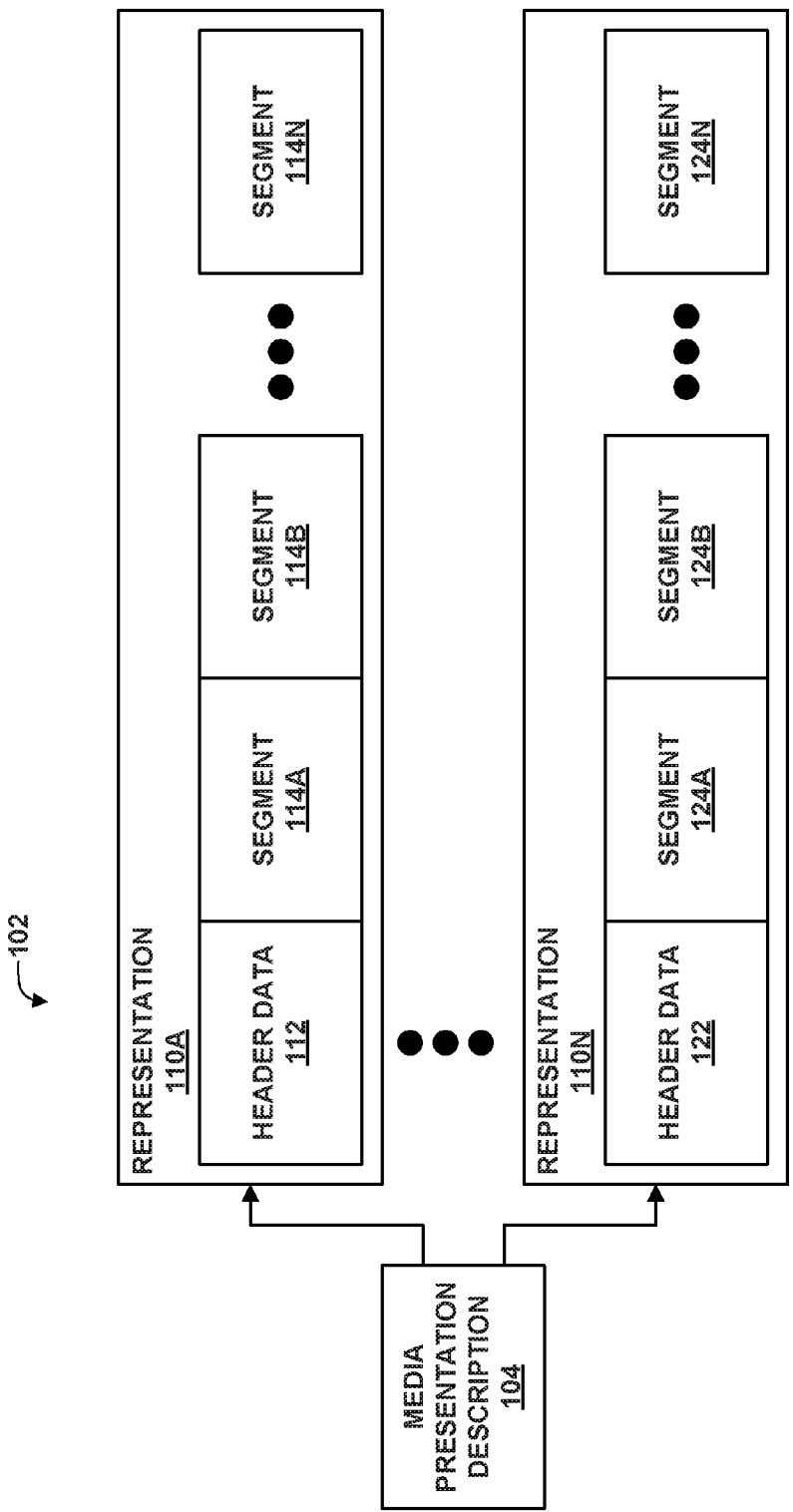
FIG. 5A is a conceptual diagram illustrating elements of example multimedia content.

FIG. 5A is a conceptual diagram illustrating elements of example multimedia content 102. Multimedia content 102 may correspond to multimedia content 64 (FIG. 4), or another multimedia content stored in storage medium 62. In the example of FIG. 5A, multimedia content 102 includes media presentation description (MPD) 104 and a plurality of representations 110A-110N (representations 110). Representation 110A includes optional header data 112 and segments 114A-114N (segments 114), while representation 110N includes optional header data 122 and segments 124A-124N (segments 124). The letter N is used to designate the last movie fragment in each of representations 110 as a matter of convenience. In some examples, there may be different numbers of movie fragments between representations 110.

MPD 104 may comprise a data structure separate from representations 110. MPD 104 may correspond to manifest file 66 of FIG. 4. Likewise, representations 110 may correspond to representations 68 of FIG. 4. In general, MPD 104 may include data that generally describes characteristics of representations 110, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPs, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 5A. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

Figure 5B:
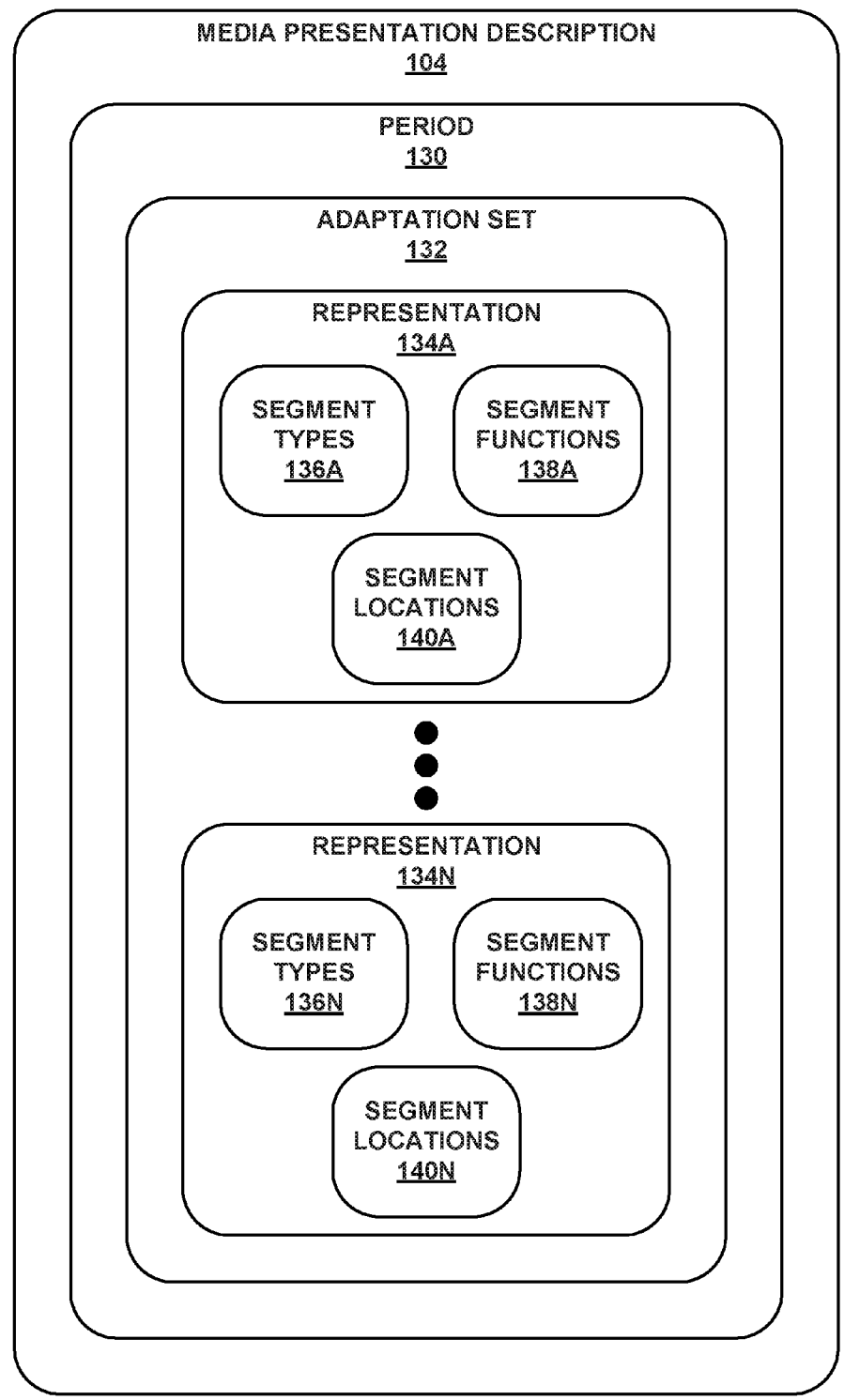
FIG. 5B is a conceptual diagram illustrating example contents of a media presentation description in accordance with the techniques of this disclosure.

FIG. 5B is a conceptual diagram illustrating example contents of media presentation description (MPD) 104 in accordance with the techniques of this disclosure. In general, among other data signaled in MPD 104, in the example of FIG. 5B, MPD 104 includes period information 130, adaptation set information 132, and representation information 134A-134N (representation information 134). Although only a single set of adaptation set information 132 is shown in this example, it should be understood that in general, a plurality of sets of adaptation set information may be included. Likewise, although only a single set of period information 130 is shown, it should be understood that in general, a plurality of sets of period information may be included.

In accordance with the techniques of this disclosure, representation information 134A includes segment types information 136A, segment functions information 138A, and segment locations 140A. Likewise, representation information 134N includes segment types information 136N, segment functions information 138N, and segment locations 140N. In general, segment types information 136A, 136N describes various types of segments included in representations corresponding to representation information 134A, 134N, respectively. For example, segment types 136A, 136N may include any or all of a delivery unit media segment type (or format), a random access media segment type (or format), a no overlap segment type (or format), and a switching media segment type (or format).

Segment functions information 138A, 138N generally describes functions performed by the various segment types. For example, segment functions information 138A, 138N may describe functions performed by any or all of a delivery unit media segment type (or format), a random access media segment type (or format), a no overlap segment type (or format), and a switching media segment type (or format), assuming such types/formats are present in corresponding segment types information 136A, 136N. Segment functions information 138A, 138N may indicate that a delivery unit media segment type is used to generally carry media data, a random access media segment type is used to provide a random access point (which includes initialization information), a no overlap segment type indicates that such segments do not overlap other segments of the same representation or other representations, and a switching media segment type allows switching between representations within the adaptation set.

Segment locations information 140A, 140N may generally signal locations (or positions) of segments of the various types within corresponding representations. Segment locations information 140A, 140N may signal frequencies with which segments of each of the delivery unit media segment type, random access media segment type, no overlap segment type, and/or switching media segment type occur within the corresponding representations. Segment locations information 140A, 140N may indicate such information in the form of a pattern (e.g., every Nth segment is a segment of type X). Additionally or alternatively, segment locations information 140A, 140N may explicitly list locations of individual segments.

Figure 6:
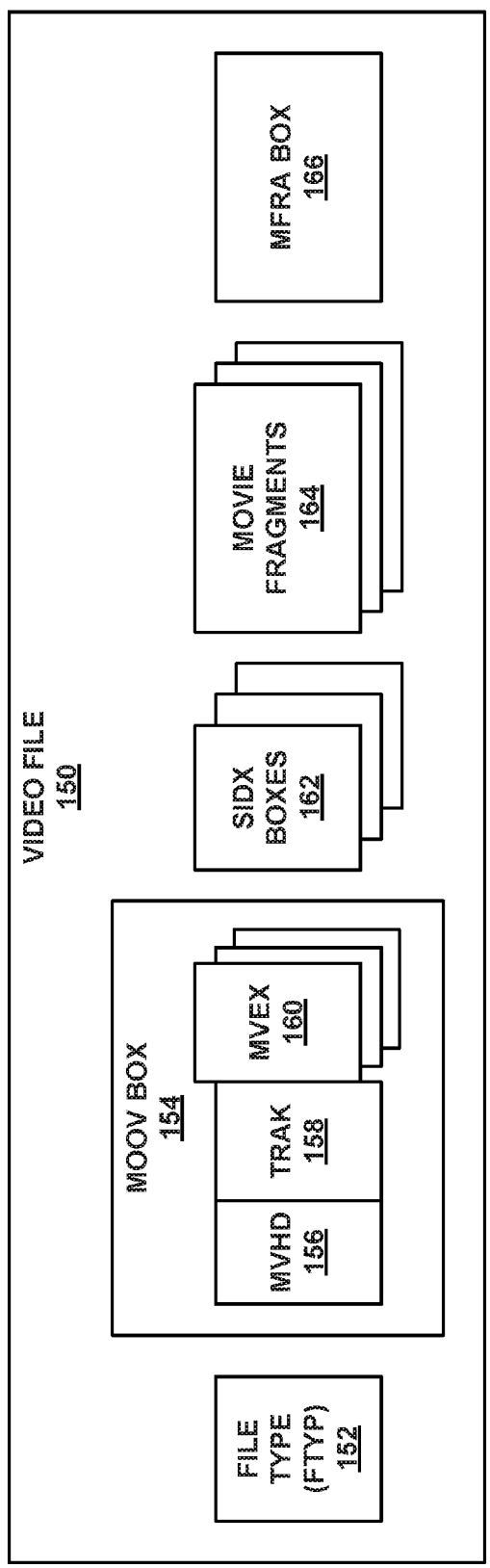
FIG. 6 is a block diagram illustrating elements of an example video file, which may correspond to a segment of a representation, such as one of the segments of FIG. 5A.

FIG. 6 is a block diagram illustrating elements of an example video file 150, which may correspond to a segment of a representation, such as one of segments 114, 124 of FIG. 5A. Each of segments 114, 124 may include data that conforms substantially to the arrangement of data illustrated in the example of FIG. 6. Video file 150 may be said to encapsulate a segment. As described above, video files in accordance with the ISO base media file format and extensions thereof store data in a series of objects, referred to as "boxes." In the example of FIG. 6, video file 150 includes file type (FTYP) box 152, movie (MOOV) box 154, segment index (sidx) boxes 162, movie fragment (MOOF) boxes 164, and movie fragment random access (MFRA) box 166.

Although FIG. 6 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
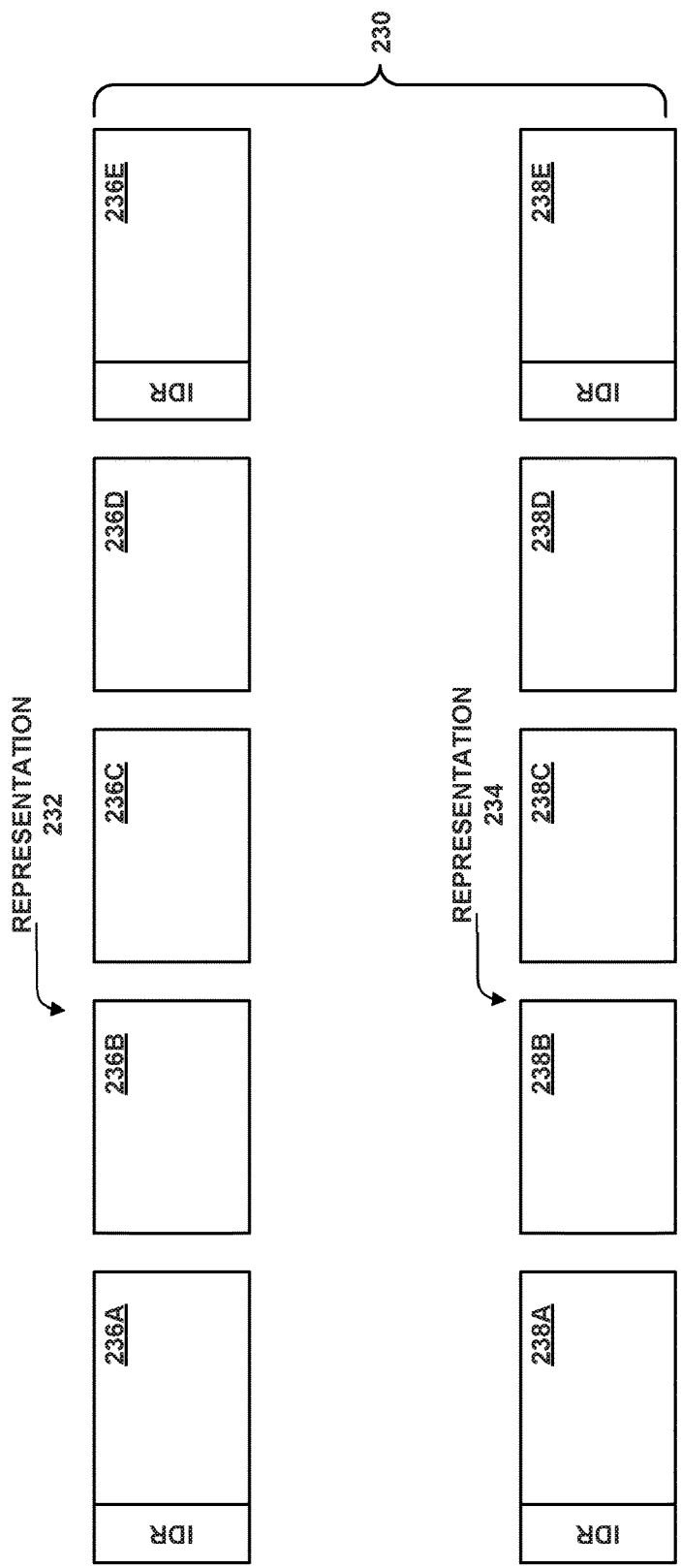
FIG. 7 is a conceptual diagram illustrating an example segment offering for a use case according to the techniques of this disclosure.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 6, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or SIDX boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 4) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 6). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Advanced Live Profile is an expected new profile that focuses on live service distribution. The anticipated profile is not necessarily considered to be backward-compatible to the extended common profile. However, it is considered that a content provider can generate a backward compatible version of the content if considered essential. The figures discussed below represent various use cases in which the techniques of this disclosure may be applied.

FIG. 7 is a conceptual diagram illustrating an example segment offering for a use case according to the techniques of this disclosure. In particular, FIG. 7 illustrates adaptation set 230, including representation 232 and representation 234. Representation 232 includes segments 236A-236E, which include IDR segment 236A and IDR segment 236E, while representation 234 includes segments 238A-238A, which include IDR segment 238A and IDR segment 238E.

This use case includes low-latency video streaming services and switching. Assume that a segment is 0.5 seconds of duration (in terms of playback time) and the frame rate is 50 frames per second (FPS). In this example, and based on the techniques of this disclosure, the setup and signaling may be as follows:

Every fourth segment is a switch/IDR (instantaneous decoder refresh) segment

Every segment is a delivery unit

The signaling may be as follows for Adaptation Set 230 according to FIG. 7:

AdaptationSet
 @timescale=50
 SegmentTimeline.S: @t=0, @d=25, @r=−1
 @randomAccessPeriod=100
 Switching: @period=100, @type="media"
 SegmentTemplate@media="http://example.com/ $RepresentationID$"/segment_$Time$.mp4
  Representation: @id=232
  Representation: @id=234

Another use case according to the techniques of this disclosure including low-latency video streaming services and switching is described with respect to FIG. 1. FIG. 1 illustrates the segment offering in the case of this use case. Assume that a short segment is 0.5 seconds of duration and the frame rate is 50 FPS. Based on the techniques discussed above, the setup and signaling for this use case may be as follows:

Each segment is a random access segment.
The segments in a broadcast representation are four times the size of those in a unicast representation.
The segment at the position of the broadcast/unicast overlap is a switching segment.

The signaling may be as follows for Adaptation Set 230 according to FIG. 7:

AdaptationSet
  @timescale=50
  Switching: @period=100, @type="media"
  SegmentTemplate@media="http://example.com/$RepresentationID$/segment_$Time$.mp4
    Representation: @id=1, @randomAccessPeriod=100
      SegmentTimeline.S: @t=0, @d=100, @r=−1
    Representation: @id=2, @randomAccessPeriod=25
      SegmentTimeline.S: @t=0, @d=25, @r=−1

Figure 8:
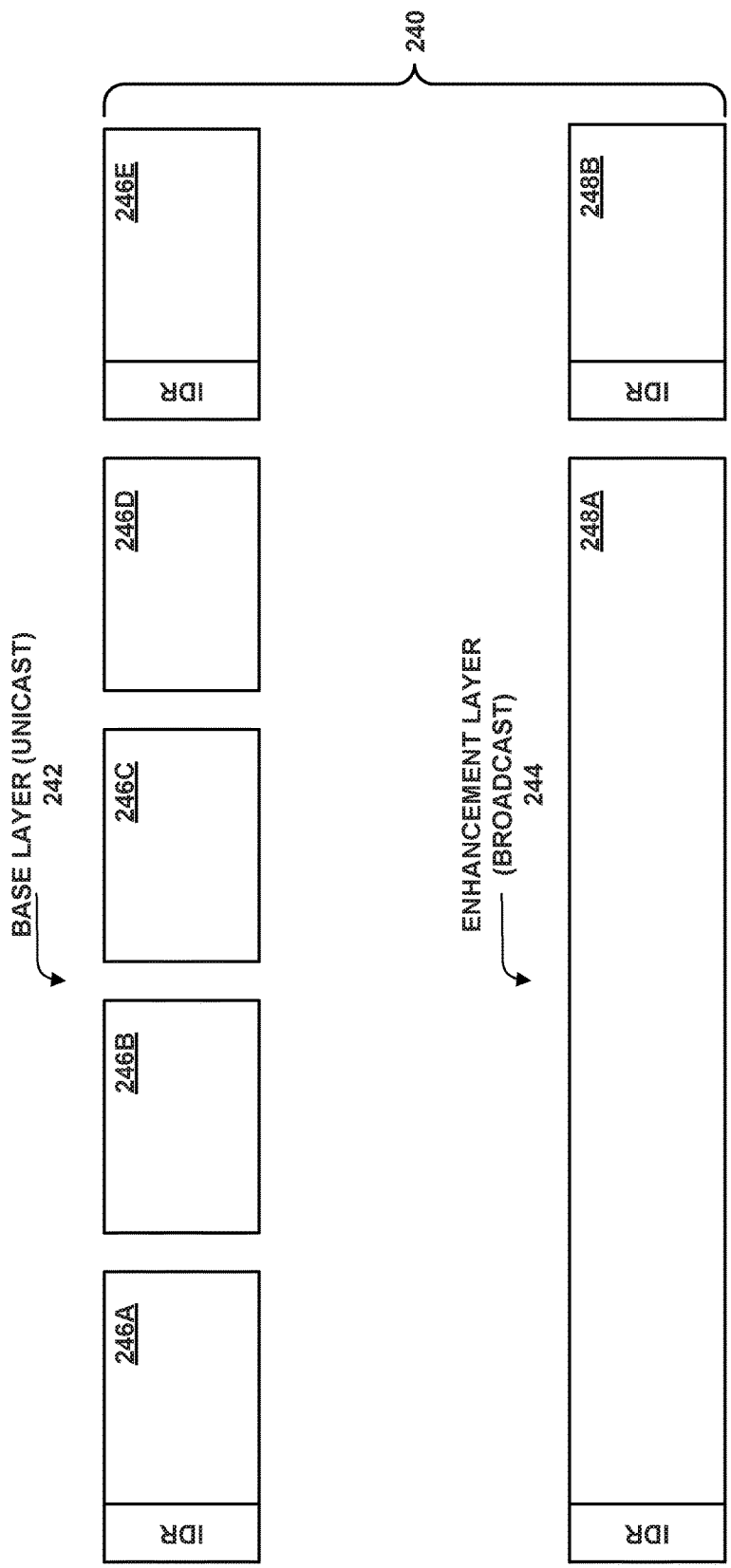
FIG. 8 is a conceptual diagram illustrating a use case including fast tune-in with scalable HEVC (SHVC) in accordance with the techniques of this disclosure.

FIG. 8 is a conceptual diagram illustrating a use case including fast tune-in with scalable HEVC (SHVC) in accordance with the techniques of this disclosure. The example of FIG. 8 illustrates adaptation set 240 including a base layer (unicast) representation 242 and an enhancement layer (broadcast) representation 244. Base layer representation 242 includes segments 246A-246E (segments 246), while enhancement layer representation 244 includes segments 248A, 248B (segments 248). Assume that a short segment is 0.5 seconds of duration and the frame rate is 50 FPS. Based on the techniques described above, the setup and signaling may be as follows:

Each of segments 246, 248 is a random access segment (although segment 246A is shown as including an IDR in FIG. 8, the random access point is not necessarily constrained to the IDR, as there may be other functional entry points. Open GOPs may be sufficient.)
Segments 248 in enhancement layer representation 244 (i.e., the broadcast representation) are four times the temporal duration of segments 246 in base layer representation 242 (i.e., the unicast representation).

The signaling may be as follows for Adaptation Set 240 according to the example of FIG. 8:

AdaptationSet
  @timescale=50
  Switching: @period=100, @type="media"
  SegmentTemplate@media="http://example.com/$RepresentationID$/segment_$Time$.mp4
    Representation: @id=242, @randomAccessPeriod=25
      SegmentTimeline.S: @t=0, @d=25, @r=−1
    Representation: @id=244, @randomAccessPeriod=100, @dependencyID=242
      SegmentTimeline.S: @t=0, @d=100, @r=−1

Figure 9:
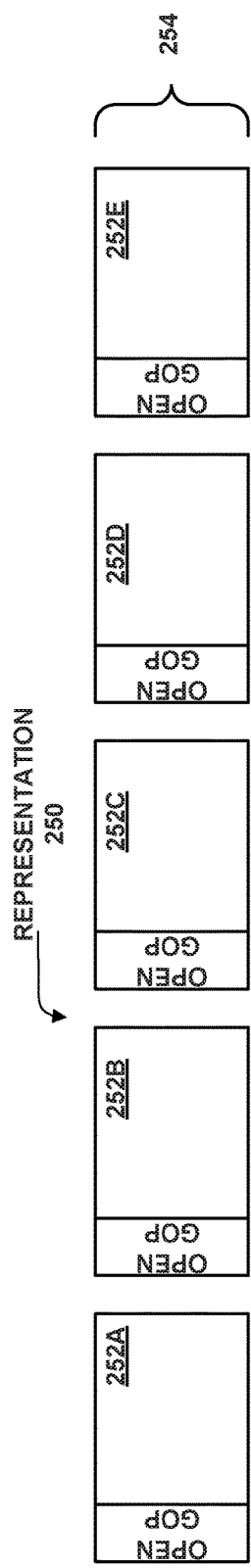
FIG. 9 is a conceptual diagram illustrating an example use case including fast tune-in with stream access point (SAP) type 3 in accordance with the techniques of this disclosure.

FIG. 9 is a conceptual diagram illustrating an example use case including fast tune-in with stream access point (SAP) type 3 in accordance with the techniques of this disclosure. In particular, in the example of FIG. 9, adaptation set 254 includes representation 250, which includes segments 252A-252E, each of which includes an open GOP. Although not show in FIG. 9, adaptation set 254 may include representations in addition to representation 250. Assume that a short segment is 0.5 seconds of duration and the frame rate is 50 FPS. The signaling may be as follows for Adaptation Set 254 according to the example of FIG. 9:

AdaptationSet
  @timescale=50
  @randomAccessPeriod=25
  SegmentTimeline.S: @t=0, @d=25, @r=−1
  SegmentTemplate@media="http://example.com/$RepresentationID$/segment_$Time$.mp4
    Representation: @id=250

Figure 10:
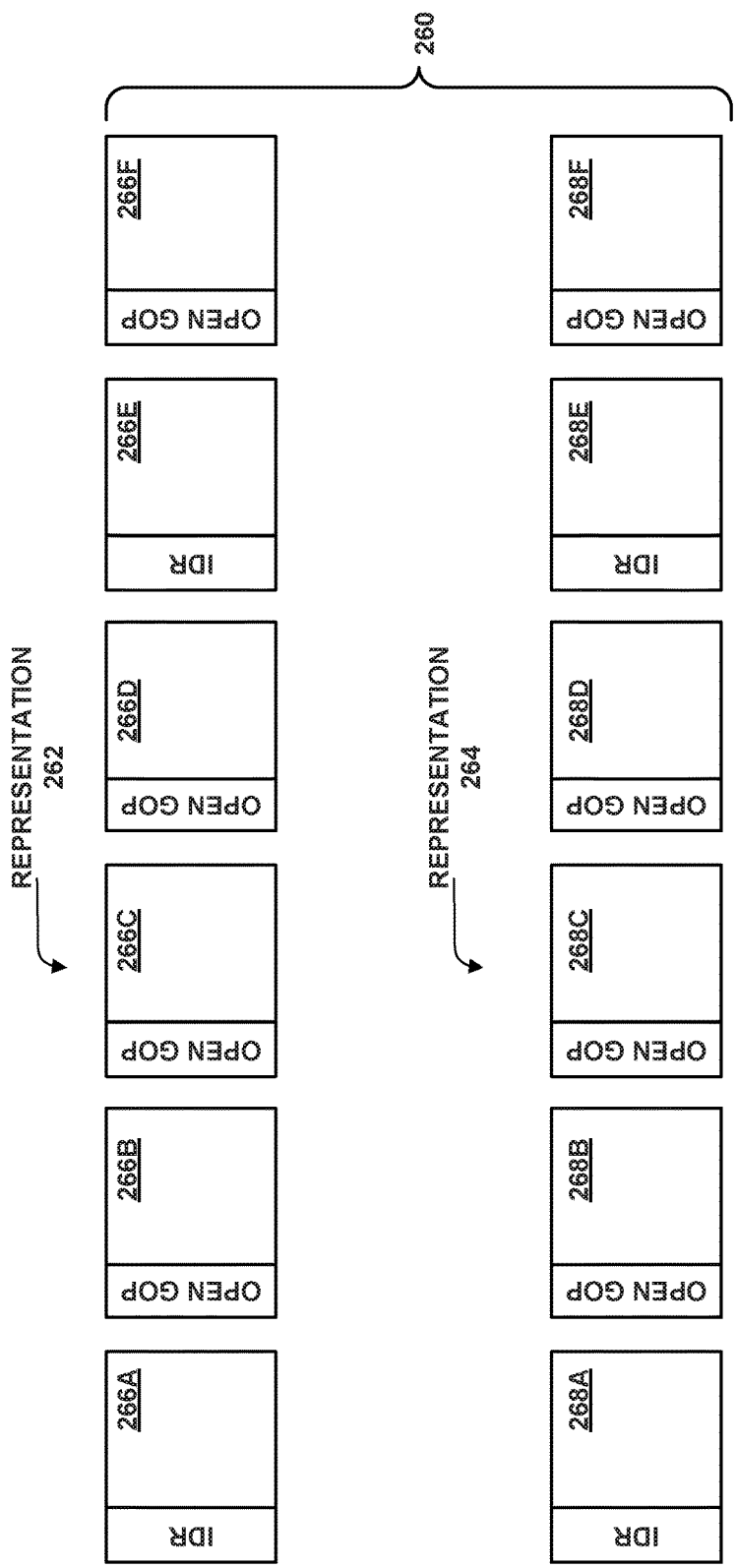
FIG. 10 is a conceptual diagram illustrating an example use case including fast tune-in and hybridization.

FIG. 10 is a conceptual diagram illustrating an example use case including fast tune-in and hybridization. In particular, in this example, adaptation set 260 includes representation 262 and representation 264. Representation 262 includes segments 266A-266F (segments 266), while representation 264 includes segments 268A-268F (segments 268). Assume that a short segment is 0.5 seconds of duration and the frame rate is 50 FPS. Based on the techniques discussed above, the setup and signaling may be as follows:

Each segment is a random access segment.
Every fourth segment is a Switch segment for media switching.

The signaling may be as follows for Adaptation Set 260 according to FIG. 10:

AdaptationSet
  @timescale=50
  SegmentTimeline.S: @t=0, @d=25, @r=−1
  @randomAccessPeriod=25
  Switching: @period=100, @type="media"
  SegmentTemplate@media="http://example.com/$RepresentationID$/segment $Time$.mp4
    Representation: @id=262
    Representation: @id=264

Figure 11:
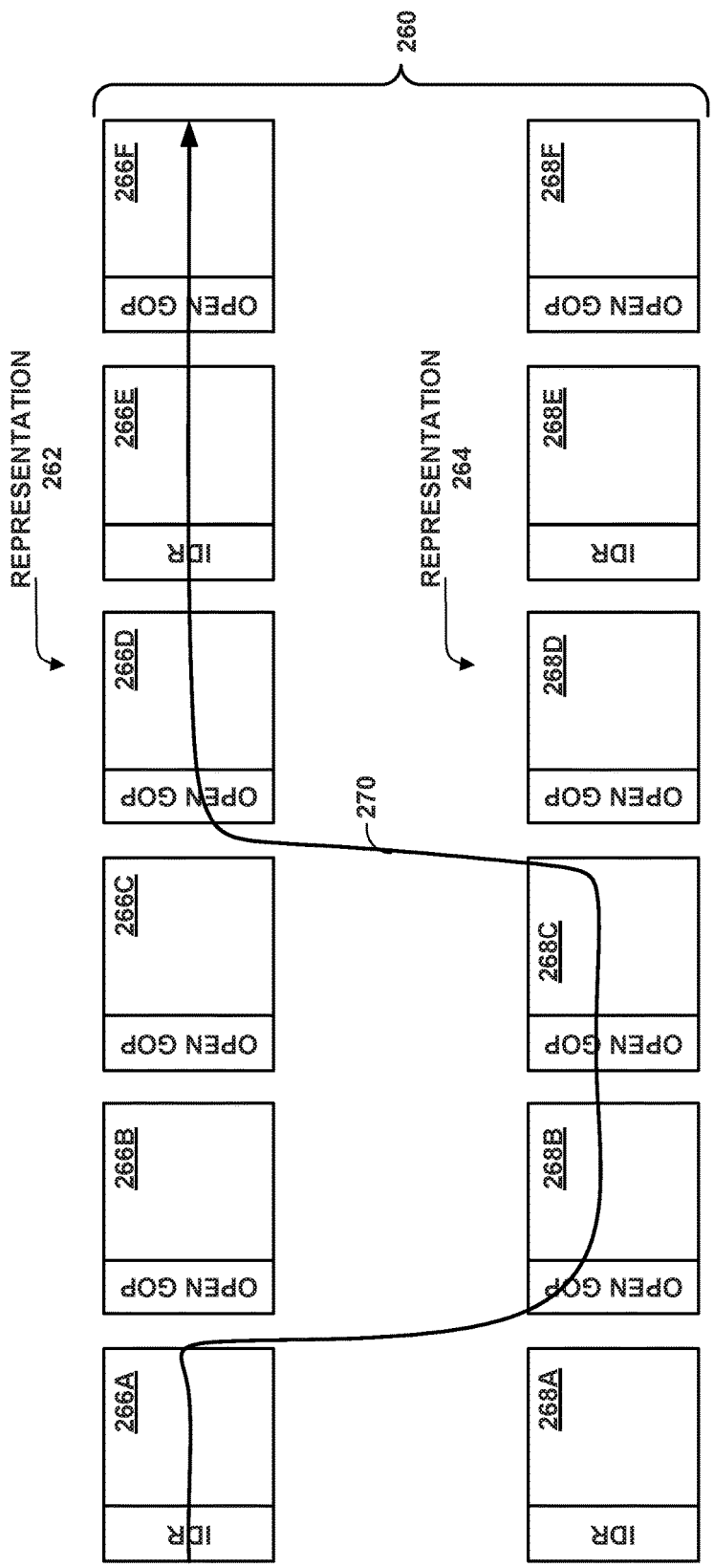
FIG. 11 is a conceptual diagram illustrating an example use case including fast tune-in, hybridization, and open GOPs.

FIG. 11 is a conceptual diagram illustrating an example use case including fast tune-in, hybridization, and open GOPs. The same segment offering as that of FIG. 10 is shown in FIG. 11. In addition, the example of FIG. 11 illustrates segment traversal 270, which represents segments retrieved by a client device, such as client device 40 (FIG. 1). That is, client device 40 may originally retrieve segment 266A of representation 262, then switch to representation 264 (e.g., because of a change in available network bandwidth). To switch, client device 40 may retrieve segment 268B. In this example, segment 266A is an IDR segment, while segment 268B is an open GOP segment. In accordance with the techniques of this disclosure, because segment 268B is an open GOP segment, client device 40 can effectuate the switch at 268B, without waiting for an IDR segment (e.g., segment 268E) of representation 264. Client device 40 also retrieves segment 268C of representation 264. Subsequently, client device 40 again switches representations, this time to representation 262, retrieving segment 266D, which is also an open GOP segment. In this example, client device 40 retrieves segments 266E and 266F from representation 262, according to segment traversal 270.

Switching may occur at SAPs of type 3. Assume that a short segment is 0.5 seconds of duration and the frame rate is 50 FPS. Based on the techniques discussed above, the setup and signaling may be as follows:

Each segment is a random access segment.
Every fourth segment is a Switch segment for media switching.
Every segment is a Switch segment for open GOP switching.

The signaling may be as follows for Adaptation Set 260 according to FIG. 11:

AdaptationSet
  @timescale=50
  SegmentTimeline.S: @t=0, @d=25, @r=−1
  @randomAccessPeriod=25
  Switching: @period=100, @type="media"
  Switching: @period=25, @type="open GOP"

SegmentTemplate@media="http://example.com/
$RepresentationID$/segment_$Time$.mp4
Representation: @id=262
Representation: @id=264

Figure 12:
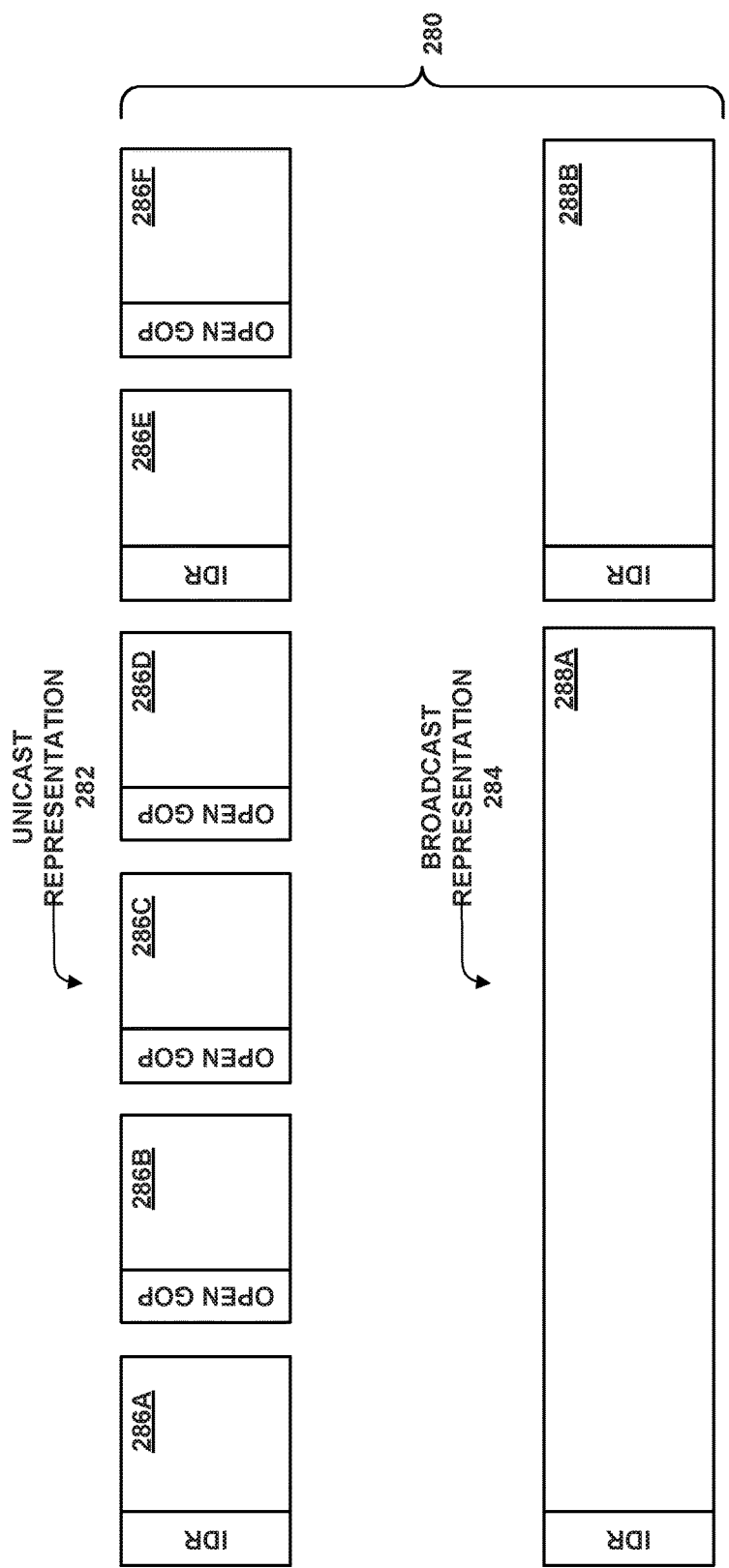
FIG. 12 is a conceptual diagram illustrating another example use case including fast tune-in and hybridization with open GOPs.

FIG. 12 is a conceptual diagram illustrating another example use case including fast tune-in and hybridization with open GOPs. In this example, adaptation set 280 includes unicast representation 282 and broadcast representation 284. Unicast representation 282 includes segments 286A-286F (segments 286), while broadcast representation 284 includes segments 288A, 288B (segments 288). Assume that a short segment is 0.5 seconds of duration and the frame rate is 50 FPS. Based on the techniques discussed above, the setup and signaling may be as follows:

Each Segment is a random access segment.
Segments 288 in broadcast representation 284 are 4 times the temporal duration of segments 286 in unicast representation 282.
Segment at positions of broadcast/unicast overlap (e.g., segments 286A, 286E, 288A, 288B) are switching segments.

The signaling may be as follows for Adaptation Set 280 according to FIG. 12:
AdaptationSet
@timescale=50
Switching: @period=100, @type="media"
SegmentTemplate@media="http://example.com/
$RepresentationID$/segment_$Time$.mp4
Representation: @id=282, @randomAccessPeriod=100
SegmentTimeline.S: @t=0, @d=100, @r=−1
Representation: @id=284, @randomAccessPeriod=25
SegmentTimeline.S: @t=0, @d=25, @r=−1

Figure 13:
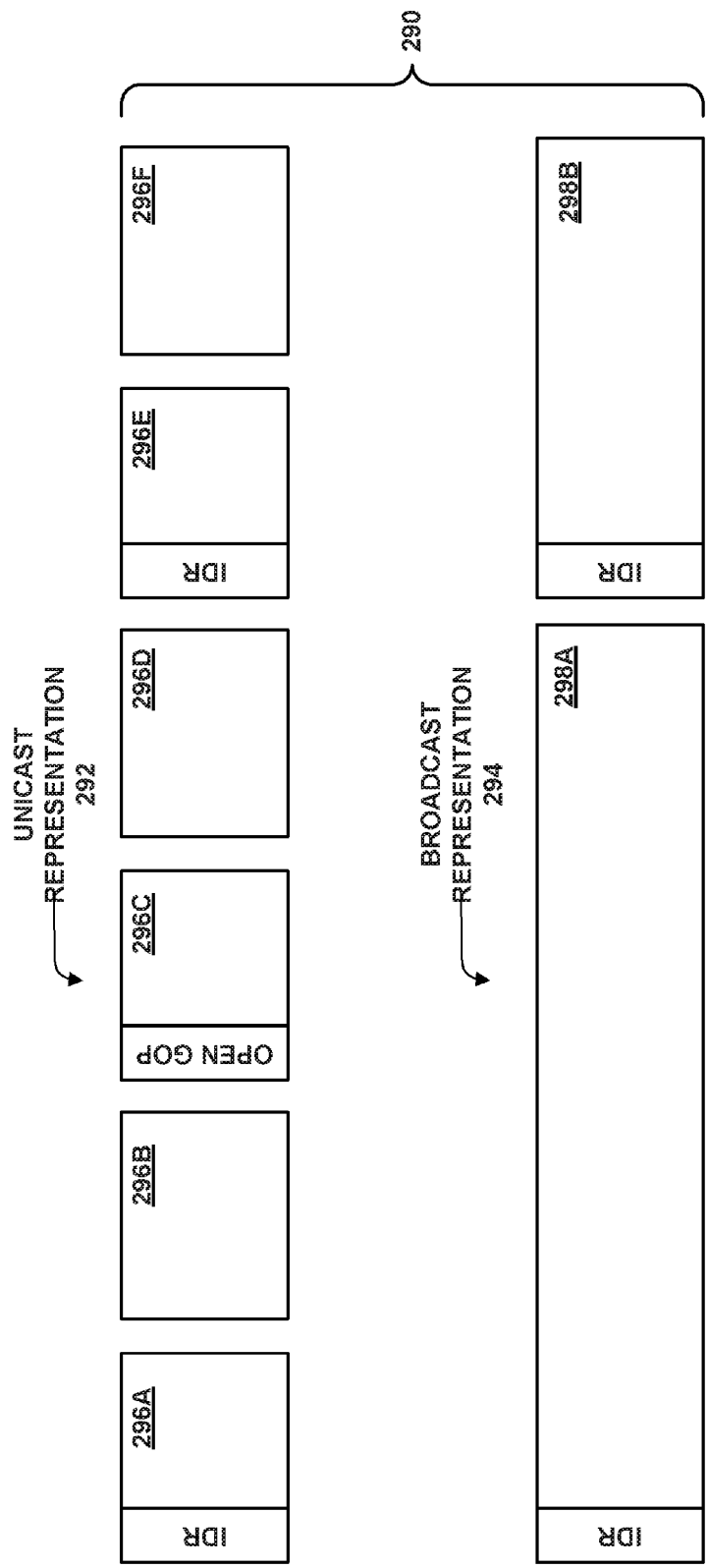
FIG. 13 is a conceptual diagram illustrating an example use case including fast tune-in and very low latency.

FIG. 13 is a conceptual diagram illustrating an example use case including fast tune-in and very low latency. In this example, adaptation set 290 includes unicast representation 292 and broadcast representation 294. Unicast representation 292 includes segments 296A-296F (segments 296), while broadcast representation 294 includes segments 298A, 298B (segments 298). Assume that a short segment is 0.5 seconds of duration and the frame rate is 50 FPS. Based on the techniques discussed above, the setup and signaling may be as follows:

Each Segment is a random access segment.
Segments 298 in broadcast representation 294 are 4 times the temporal duration of segments 296 in unicast representation 292.
Segment at positions of broadcast/unicast overlap (e.g., segments 296A, 296E, 298A, 298B) are switching segments.

Furthermore, not all segments 296 of representation 292 provide information for switching. For example, segment 296C allows switching from broadcast representation 294 to unicast representation 292 (e.g., if the broadcast service becomes unavailable). However, segments 296B, 296D, and 296F conform to a delivery unit media segment format, and do not include switch points. This allows more bits of segments 296B, 296D, and 296F to be allocated to non-intra predicted frames (e.g., inter-predicted frames), e.g., such that these frames can be coded with a higher quality.

The signaling may be as follows for Adaptation Set 290 according to FIG. 13:
AdaptationSet
@timescale=50
Switching: @period=100, @type="media"
SegmentTemplate@media="http://example.com/
$RepresentationID$/segment_$Time$.mp4
Representation: @id=292, @randomAccessPeriod=100
SegmentTimeline.S: @t=0, @d=100, @r=−1
Representation: @id=294, @randomAccessPeriod=50
SegmentTimeline.S: @t=0, @d=25, @r=−1

Figure 14:
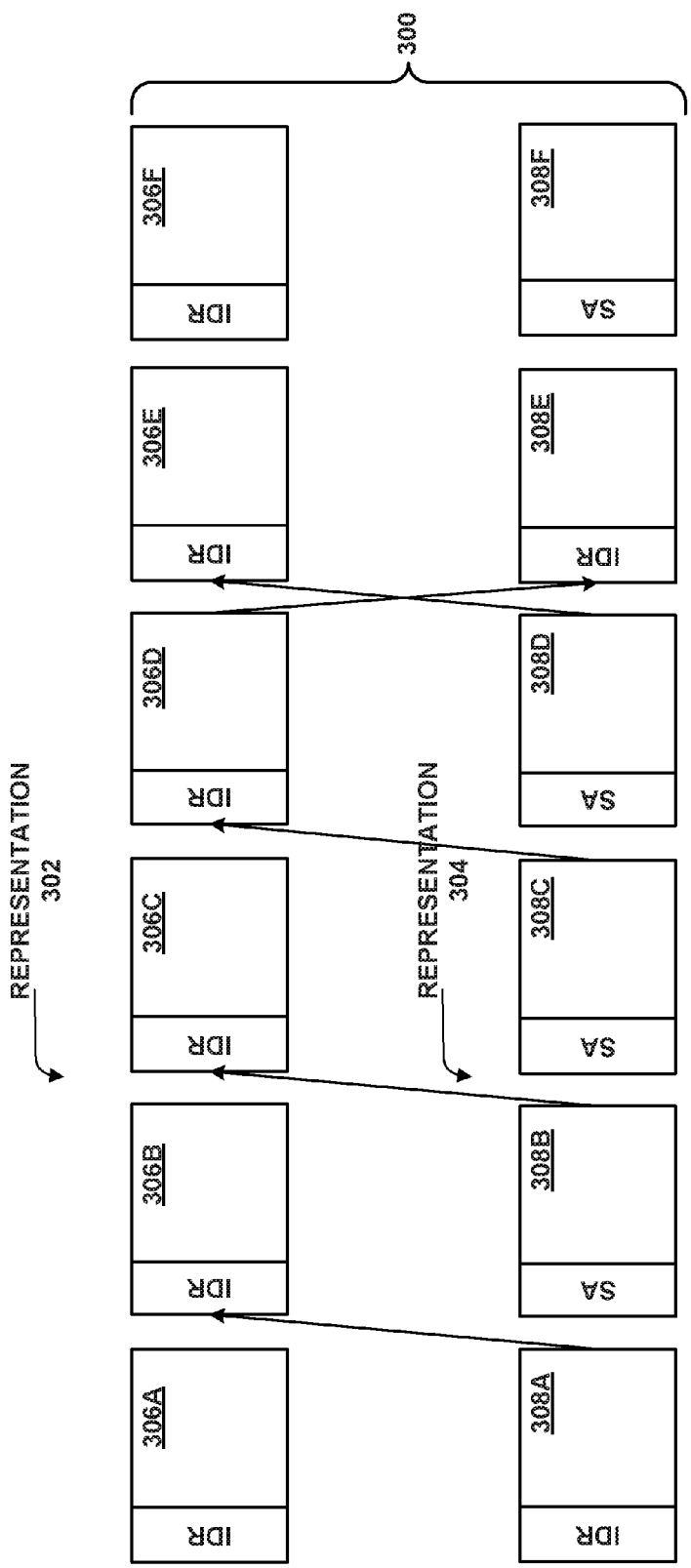
FIG. 14 is a conceptual diagram illustrating another example use case including fast tune-in and very low latency.

FIG. 14 is a conceptual diagram illustrating another example use case including fast tune-in and very low latency. In this example, adaptation set 300 includes representation 302 and representation 304. Representation 302 includes segments 306A-306F (segments 306), while representation 304 includes segments 308A-308F (segments 308). Assume that a short segment is 0.5 seconds of duration and the frame rate is 50 FPS. Based on the techniques discussed above, the setup and signaling may be as follows:

Each of segments 306 in representation 302 is a random access segment.

That is, as shown in FIG. 14, each of segments 306 includes an IDR picture. However, segments 308A and 308E of representation 304 include IDR pictures, whereas segments 308B, 308C, 308D, and 308F do not include IDR pictures. This allows a client device, such as client device 40 (FIG. 1) to quickly tune in to media content of adaptation set 300 by retrieving a most recently available one of segments 306, then switching to representation 304 when a next one of segments 308 including an IDR is available.

The signaling may be as follows for Adaptation Set 300 according to FIG. 14:
AdaptationSet
@timescale=50
Switching: @period=100, @type="media"
SegmentTimeline.S: @t=0, @d=25, @r=−1
SegmentTemplate@media="http://example.com/
$RepresentationID$/segment_$Time$.mp4
Representation: @id=302, @randomAccessPeriod=25
Switching: @period=25, @type="media"
Representation: @id=304, @randomAccessPeriod=100
Switching: @period=100, @type="media"

In this manner, the techniques of this disclosure include
Additional new segment types.
Additional MPD signaling for Switching and @randomAccessPeriod.
Definitions for different types of switching.
Media switching: Segment alignment and SAP type 1 or 2.
Bitstream switching: concatenation is permitted.
Open GOP switching.
Add a profile that documents the extensions and restrictions.
Document any issues on backward-compatibility.
Provide more detailed examples.

There remain open questions and alternatives. The following issues remain open:
Number-based signaling as an addition or alternative to the techniques of this disclosure is possible, which may provide certain implications and benefits.
Different types of open GOP switching as an addition or alternative to the techniques of this disclosure is also possible, which may parallel resampling and non-resampling.
Additional or alternative media formats may be used with respect to those discussed above.

Subsegments, in addition to or in the alternative to full segments, may also be used in some examples. A segment index box (SIDX) such as shown in FIG. 6 above may signal the locations of subsegments, and/or additional information may be signaled (e.g., in file metadata and/or in a manifest file, such as in an MPD).

Figure 15:
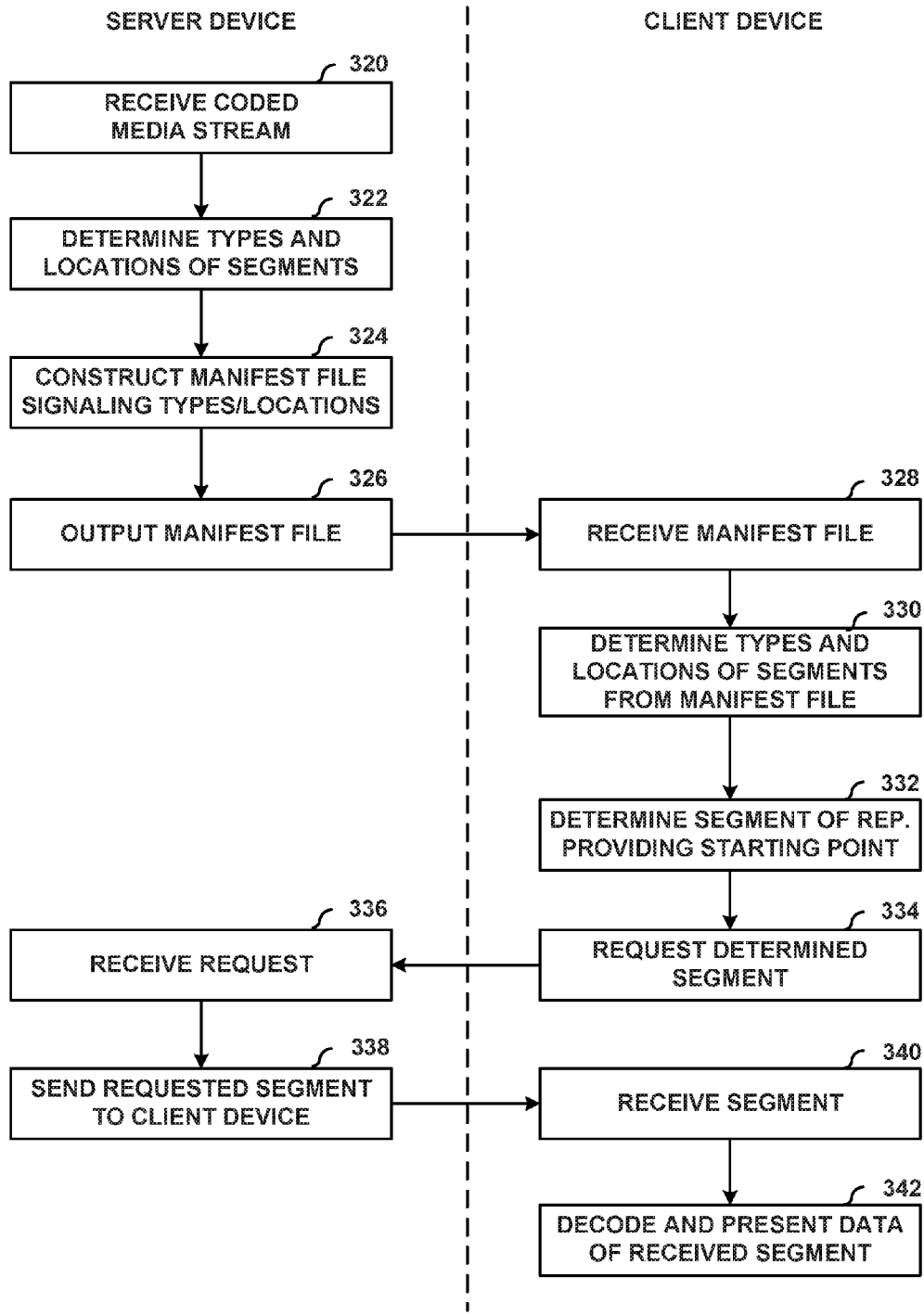
FIG. 15 is a flowchart illustrating an example method for retrieving a segment of a representation of media content in accordance with the techniques of this disclosure.

FIG. 15 is a flowchart illustrating an example method for retrieving a segment of a representation of media content in accordance with the techniques of this disclosure. The method of FIG. 15 is described as being performed by server device 60 and client device 40 of FIG. 4. However, it should be understood that the method may be performed by other devices. For example, all or portions of the method attributed to the server device may be performed by content preparation device 20 of FIG. 4 (e.g., in addition to or in the alternative to server device 60 of FIG. 4). Likewise, all or portions of the method attributed to the client device may be performed by a middleware unit of the client device that is configured to receive media data via broadcast and/or unicast transmission.

In this example, server device 60 initially receives a coded media stream (320). In some examples, server device 60 receives the coded media stream from content preparation device 20, while in other examples, server device 60 may include one or more encoders to encode raw media data to form the coded media stream.

Server device 60 then, in this example, determines types and locations of segments within the coded media stream (322). In some examples, server device 60 may form the segments (that is, independently retrievable files), while in other examples, server device 60 may receive and analyze the segments as part of the coded media stream, and determine types for the segments based on their characteristics. Characteristics of various types of segments are discussed above, such as delivery unit media segments, random access media segments, no overlap segments, and switching media segments. Thus, server device 60 may analyze each segment to determine which of these segment types match characteristics of the segment being analyzed. Furthermore, server device 60 may determine locations of the segments of each type within the coded media stream. For example, server device 60 may determine frequencies with which each segment type occurs. As an example, with respect to FIG. 7, segments including an IDR (that is, random access media segments) occur every fourth segment of each of representations 232, 234.

In this example, server device 60 then constructs a manifest file (such as an MPD) signaling the types and locations of the segments (324). Alternatively, server device 60 may receive the manifest file, partially or fully constructed according to the techniques of this disclosure, from content preparation device 20. Server device 60 may construct the manifest file to include information (that is, "signal") the types and locations of the segments within each corresponding representation of each adaptation set represented by the manifest file. Server device 60 may construct the manifest file to include data similar to that discussed above with respect to the examples of FIGS. 7-14. It should be understood that the manifest file is separate from the representations and the media data of the representations itself. For example, the manifest file may be available for request separately from requests made for the media data (e.g., segments or portions of segments) described by the manifest file.

Server device 60 may then output the manifest file (326), e.g., to client device 40. In some examples, client device 40 may initially request the manifest file, e.g., via a unicast request for the manifest file. In other examples, client device 40 may subscribe to a broadcast transmission, and server device 60 may periodically output the manifest file via the broadcast. In any case, client device 40 may receive the manifest file (328) that was output by server device 60.

Client device 40 may then determine types and locations of segments from the manifest file (330). For example, client device 40 may determine that the manifest file indicates that a particular adaptation set includes representations including, for example, delivery unit media segments, random access media segments, no overlap segments, and switching media segments. Client device 40 may also determine locations of each of these types of segments. For example, client device 40 may determine frequencies with which all or a portion of these types of segments occur from the manifest file.

Client device 40 may determine one of the representations from which to begin retrieving media data. Client device 40 may perform any of the various use cases discussed above. In order to achieve a low latency playback, client device 40 may determine which of the representations, if any, has the most frequent segments including stream access points (SAPs), e.g., IDR frames. Such a representation may include segments available for retrieval via unicast. Client device 40 may be configured to initially retrieve such segments from the unicast representation, then to switch to a broadcast representation at the next available SAP of the broadcast representation (again, as indicated by the manifest file).

In any case, client device 40 may determine a segment of a representation providing a starting point (332). As discussed above, the segment may comprise a random access media segment, that is, conform to a random access media segment format. Likewise, client device 40 may determine a uniform resource locator (URL) for the determined segment, e.g., according to a template specified by the manifest file. Client device 40 may then request the determined segment (334), e.g., by issuing an HTTP Get or partial Get request for the URL to server device 60.

Server device 60 may then receive the request (336) and then send the requested segment to client device 40 (338) in response to the request. After receiving the segment (340), client device 40 may initially buffer data of the received segment, then ultimately decode and present data of the received segment (342).

As discussed above, after initially retrieving the determined segment of the representation, client device 40 may determine whether and when to switch to a different representation. For example, the initial representation may include very frequent SAPs, and a target representation may include relatively infrequent SAPs. Client device 40 may continue to request segments from the initial representation until reaching a segment including a SAP (e.g., a random access media segment or a switching media segment) of the target representation. Then, client device 40 may either begin requesting segments from the target representation (if the target representation is available via unicast) or subscribe to a broadcast service that is transporting media data of the target representation (if the target representation is available via broadcast).

In this manner, FIG. 15 represents an example of a method including determining, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, determining, from the manifest file, a segment of the representation conforming to the type that provides the point at which to begin retrieving data from the representation, and retrieving the determined segment from the representation.

FIG. 15 also represents an example of a method including constructing a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, sending the manifest file to a client device, and, in response to a request from the client device for the segment conforming to the type that provides the point at which to begin retrieving data from the representation, sending the segment that provides the point at which to begin retrieving data from the representation to the client device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   determining, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, and wherein the plurality of types of segments include:
      a delivery unit media segment format that indicates that corresponding segments include media data;
      a random access media segment format that indicates that corresponding segments provide points at which retrieving data from the representation can begin;
      a no overlap segment format that indicates that corresponding segments do not overlap starting and ending times of other segments in the representation and other segments in other representations in an adaptation set including the representation; and
      a switching media segment format that indicates that corresponding segments provide points at which retrieval can switch to the representation from the other representations in the adaptation set without reinitialization;
   determining, from the manifest file, a segment of the representation conforming to the type that provides the point at which to begin retrieving data from the representation; and
   retrieving the determined segment from the representation.

2. The method of claim 1, wherein the delivery unit media segment format indicates that corresponding segments:
   contain a value of "dums" in a segment type box of the segment;
   include one or more self-contained movie fragments, wherein each self-contained movie fragment comprises a movie fragment ("moof") box and a media data ("mdat") box that contains media samples that do not use external data references referenced by a track in the movie fragment box;

each of the moof boxes contains at least one track fragment;

each of the moof boxes does not use external references;

a "default-base-is-moof" flag of the media segment is set to true; and a "base-data-offset-present" flag of the media segment is set to false.

3. The method of claim 1, wherein the random access media segment format indicates that corresponding segments:

comprise random access segments, an ordinal first access unit in each movie fragment of the segments corresponds to an $I_{SAU}$ of a stream access point (SAP) of type 1, 2, or 3; and include all necessary information to access media data in a bitstream following the segments.

4. The method of claim 3, wherein the random access media segment format indicates that corresponding segments comprise at least one of an instantaneous decoder refresh (IDR) picture, a broken link access (BLA) picture, or a clean random access (CRA) picture.

5. The method of claim 1, wherein the random access media segment format indicates that corresponding segments include one or more segment index ("sidx") boxes, and wherein an ordinal first sidx box precedes all moof boxes of the media segment and describes the entire media segment.

6. The method of claim 1, wherein the switching media segment format indicates that an ordinal first sample in an ordinal first movie fragment of the corresponding segments corresponds to an $I_{SAU}$ of a stream access point (SAP) of type 1 or 2.

7. A client device for retrieving media data, the client device comprising one or more processors configured to:

determine, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, and wherein the plurality of types of segments include:

a delivery unit media segment format that indicates that corresponding segments include media data;

a random access media segment format that indicates that corresponding segments provide points at which retrieving data from the representation can begin;

a no overlap segment format that indicates that corresponding segments do not overlap starting and ending times of other segments in the representation and other segments in other representations in an adaptation set including the representation; and a switching media segment format that indicates that corresponding segments provide points at which retrieval can switch to the representation from the other representations in the adaptation set without reinitialization;

determine, from the manifest file, a segment of the representation conforming to the type that provides the point at which to begin retrieving data from the representation; and retrieve the determined segment from the representation.

8. The client device of claim 7, wherein the delivery unit media segment format indicates that corresponding segments:

contain a value of "dums" in a segment type box of the segment;

include one or more self-contained movie fragments, wherein each self-contained movie fragment comprises a movie fragment ("moof") box and a media data ("mdat") box that contains media samples that do not use external data references referenced by a track in the movie fragment box;

each of the moof boxes contains at least one track fragment;

each of the moof boxes does not use external references;

a "default-base-is-moof" flag of the media segment is set to true; and a "base-data-offset-present" flag of the media segment is set to false.

9. The client device of claim 7, wherein the random access media segment format indicates that corresponding segments:

comprise random access segments, an ordinal first access unit in each movie fragment of the segments corresponds to an $I_{SAU}$ of a stream access point (SAP) of type 1, 2, or 3; and include all necessary information to access media data in a bitstream following the segments.

10. The client device of claim 9, wherein the random access media segment format indicates that corresponding segments comprise at least one of an instantaneous decoder refresh (IDR) picture, a broken link access (BLA) picture, or a clean random access (CRA) picture.

11. The client device of claim 7, wherein the random access media segment format indicates that corresponding segments include one or more segment index ("sidx") boxes, and wherein an ordinal first sidx box precedes all moof boxes of the media segment and describes the entire media segment.

12. The client device of claim 7, wherein the switching media segment format indicates that an ordinal first sample in an ordinal first movie fragment of the corresponding segments corresponds to an $I_{SAU}$ of a stream access point (SAP) of type 1 or 2.

13. A client device for retrieving media data, the client device comprising:

means for determining, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, and wherein the plurality of types of segments include:

a delivery unit media segment format that indicates that corresponding segments include media data;

a random access media segment format that indicates that corresponding segments provide points at which retrieving data from the representation can begin;

a no overlap segment format that indicates that corresponding segments do not overlap starting and ending times of other segments in the representation and other segments in other representations in an adaptation set including the representation; and a switching media segment format that indicates that corresponding segments provide points at which retrieval can switch to the representation from the other representations in the adaptation set without reinitialization;

means for determining, from the manifest file, a segment of the representation conforming to the type that provides the point at which to begin retrieving data from the representation; and means for retrieving the determined segment from the representation.

14. The client device of claim 13, wherein the delivery unit media segment format indicates that corresponding segments:

contain a value of "dums" in a segment type box of the segment;

include one or more self-contained movie fragments, wherein each self-contained movie fragment comprises a movie fragment ("moof") box and a media data ("mdat") box that contains media samples that do not use external data references referenced by a track in the movie fragment box;

each of the moof boxes contains at least one track fragment;

each of the moof boxes does not use external references;

a "default-base-is-moof" flag of the media segment is set to true; and a "base-data-offset-present" flag of the media segment is set to false.

15. The client device of claim 13, wherein the random access media segment format indicates that corresponding segments:

comprise random access segments, an ordinal first access unit in each movie fragment of the segments corresponds to an $I_{SAU}$ of a stream access point (SAP) of type 1, 2, or 3; and include all necessary information to access media data in a bitstream following the segments.

16. The client device of claim 15, wherein the random access media segment format indicates that corresponding segments comprise at least one of an instantaneous decoder refresh (IDR) picture, a broken link access (BLA) picture, or a clean random access (CRA) picture.

17. The client device of claim 13, wherein the random access media segment format indicates that corresponding segments include one or more segment index ("sidx") boxes, and wherein an ordinal first sidx box precedes all moof boxes of the media segment and describes the entire media segment.

18. The client device of claim 13, wherein the switching media segment format indicates that an ordinal first sample in an ordinal first movie fragment of the corresponding segments corresponds to an $I_{SAU}$ of a stream access point (SAP) of type 1 or 2.

19. A computer-readable storage medium having stored thereon instructions that, when executed, cause a processor to:

determine, from a manifest file, a plurality of types of segments included in a representation of media content, one or more functions provided by each of the types of segments, and positions of segments conforming to each of the types of segments in the representation, wherein at least one of the types of segments provides a point at which to begin retrieving data from the representation, and wherein the plurality of types of segments include:

a delivery unit media segment format that indicates that corresponding segments include media data;

a random access media segment format that indicates that corresponding segments provide points at which retrieving data from the representation can begin;

a no overlap segment format that indicates that corresponding segments do not overlap starting and ending times of other segments in the representation and other segments in other representations in an adaptation set including the representation; and a switching media segment format that indicates that corresponding segments provide points at which retrieval can switch to the representation from the other representations in the adaptation set without reinitialization;

determine, from the manifest file, a segment of the representation conforming to the type that provides the point at which to begin retrieving data from the representation; and retrieve the determined segment from the representation.

20. The computer-readable storage medium of claim 19, wherein the delivery unit media segment format indicates that corresponding segments:

contain a value of "dums" in a segment type box of the segment;

include one or more self-contained movie fragments, wherein each self-contained movie fragment comprises a movie fragment ("moof") box and a media data ("mdat") box that contains media samples that do not use external data references referenced by a track in the movie fragment box;

each of the moof boxes contains at least one track fragment;

each of the moof boxes does not use external references;

a "default-base-is-moof" flag of the media segment is set to true; and a "base-data-offset-present" flag of the media segment is set to false.

21. The computer-readable storage medium of claim 19, wherein the random access media segment format indicates that corresponding segments:

comprise random access segments, an ordinal first access unit in each movie fragment of the segments corresponds to an $I_{SAU}$ of a stream access point (SAP) of type 1, 2, or 3; and include all necessary information to access media data in a bitstream following the segments.

22. The computer-readable storage medium of claim 21, wherein the random access media segment format indicates that corresponding segments comprise at least one of an instantaneous decoder refresh (IDR) picture, a broken link access (BLA) picture, or a clean random access (CRA) picture.

23. The computer-readable storage medium of claim 19, wherein the random access media segment format indicates that corresponding segments include one or more segment index ("sidx") boxes, and wherein an ordinal first sidx box precedes all moof boxes of the media segment and describes the entire media segment.

24. The computer-readable storage medium of claim 19, wherein the switching media segment format indicates that an ordinal first sample in an ordinal first movie fragment of the corresponding segments corresponds to an $I_{SAU}$ of a stream access point (SAP) of type 1 or 2.

25. A method of signaling media information, the method comprising:

constructing a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, and wherein the plurality of types of segments include:
- a delivery unit media segment format that indicates that corresponding segments include media data;
- a random access media segment format that indicates that corresponding segments provide points at which retrieving data from the representation can begin;
- a no overlap segment format that indicates that corresponding segments do not overlap starting and ending times of other segments in the representation and other segments in other representations in an adaptation set including the representation; and
- a switching media segment format that indicates that corresponding segments provide points at which retrieval can switch to the representation from the other representations in the adaptation set without reinitialization;

sending the manifest file to a client device; and in response to a request from the client device for the segment conforming to the type that provides the point at which to begin retrieving data from the representation, sending the segment that provides the point at which to begin retrieving data from the representation to the client device.

26. The method of claim 25, wherein the delivery unit media segment format indicates that corresponding segments:
- contain a value of "dums" in a segment type box of the segment;
- include one or more self-contained movie fragments, wherein each self-contained movie fragment comprises a movie fragment ("moof") box and a media data ("mdat") box that contains media samples that do not use external data references referenced by a track in the movie fragment box;
- each of the moof boxes contains at least one track fragment;
- each of the moof boxes does not use external references;
- a "default-base-is-moof" flag of the media segment is set to true; and
- a "base-data-offset-present" flag of the media segment is set to false.

27. The method of claim 25, wherein the random access media segment format indicates that corresponding segments:
- comprise random access segments, an ordinal first access unit in each movie fragment of the segments corresponds to an $I_{SAU}$ of a stream access point (SAP) of type 1, 2, or 3; and
- include all necessary information to access media data in a bitstream following the segments.

28. The method of claim 25, wherein the random access media segment format indicates that corresponding segments include one or more segment index ("sidx") boxes, and wherein an ordinal first sidx box precedes all moof boxes of the media segment and describes the entire media segment.

29. The method of claim 25, wherein the switching media segment format indicates that an ordinal first sample in an ordinal first movie fragment of the corresponding segments corresponds to an $I_{SAU}$ of a stream access point (SAP) of type 1 or 2.

30. A server device for signaling media information, the server device comprising one or more processors configured to:
construct a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, and wherein the plurality of types of segments include:
- a delivery unit media segment format that indicates that corresponding segments include media data;
- a random access media segment format that indicates that corresponding segments provide points at which retrieving data from the representation can begin;
- a no overlap segment format that indicates that corresponding segments do not overlap starting and ending times of other segments in the representation and other segments in other representations in an adaptation set including the representation; and
- a switching media segment format that indicates that corresponding segments provide points at which retrieval can switch to the representation from the other representations in the adaptation set without reinitialization;

send the manifest file to a client device; and in response to a request from the client device for the segment conforming to the type that provides the point at which to begin retrieving data from the representation, send the segment that provides the point at which to begin retrieving data from the representation to the client device.

31. The server device of claim 30, wherein the delivery unit media segment format indicates that corresponding segments:
- contain a value of "dums" in a segment type box of the segment;
- include one or more self-contained movie fragments, wherein each self-contained movie fragment comprises a movie fragment ("moof") box and a media data ("mdat") box that contains media samples that do not use external data references referenced by a track in the movie fragment box;
- each of the moof boxes contains at least one track fragment;
- each of the moof boxes does not use external references;
- a "default-base-is-moof" flag of the media segment is set to true; and
- a "base-data-offset-present" flag of the media segment is set to false.

32. The server device of claim 30, wherein the random access media segment format indicates that corresponding segments:
- comprise random access segments, an ordinal first access unit in each movie fragment of the segments corresponds to an $I_{SAU}$ of a stream access point (SAP) of type 1, 2, or 3; and
- include all necessary information to access media data in a bitstream following the segments.

33. The server device of claim 30, wherein the random access media segment format indicates that corresponding segments include one or more segment index ("sidx") boxes, and wherein an ordinal first sidx box precedes all moof boxes of the media segment and describes the entire media segment.

34. The server device of claim 30, wherein the switching media segment format indicates that an ordinal first sample in an ordinal first movie fragment of the corresponding segments corresponds to an $I_{SAU}$ of a stream access point (SAP) of type 1 or 2.

35. A server device for signaling media information, the server device comprising:
  means for constructing a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, and wherein the plurality of types of segments include:
    a delivery unit media segment format that indicates that corresponding segments include media data;
    a random access media segment format that indicates that corresponding segments provide points at which retrieving data from the representation can begin;
    a no overlap segment format that indicates that corresponding segments do not overlap starting and ending times of other segments in the representation and other segments in other representations in an adaptation set including the representation; and
    a switching media segment format that indicates that corresponding segments provide points at which retrieval can switch to the representation from the other representations in the adaptation set without reinitialization;
  means for sending the manifest file to a client device; and
  means for sending the segment that provides the point at which to begin retrieving data from the representation to the client device in response to a request from the client device for the segment conforming to the type that provides the point at which to begin retrieving data from the representation.

36. A non-transitory computer-readable storage medium having stored thereon instructions that, when executed, cause a processor of a server device to:
  construct a manifest file indicating a plurality of types of segments included in a representation of media content, one or more functions provided by each of the types of segments, positions of segments conforming to each of the types of segments in the representation, wherein at least one of the types of segments provides a point at which to begin retrieving data from the representation, and a segment of the representation conforming to the type that provides the point at which to begin retrieving data from the representation, and wherein the plurality of types of segments include:
    a delivery unit media segment format that indicates that corresponding segments include media data;
    a random access media segment format that indicates that corresponding segments provide points at which retrieving data from the representation can begin;
    a no overlap segment format that indicates that corresponding segments do not overlap starting and ending times of other segments in the representation and other segments in other representations in an adaptation set including the representation; and
    a switching media segment format that indicates that corresponding segments provide points at which retrieval can switch to the representation from the other representations in the adaptation set without reinitialization;
  send the manifest file to a client device; and
  send the segment that provides the point at which to begin retrieving data from the representation to the client device in response to a request from the client device for the segment conforming to the type that provides the point at which to begin retrieving data from the representation.

37. The non-transitory computer-readable storage medium of claim 36, wherein the delivery unit media segment format indicates that corresponding segments:
  contain a value of "dums" in a segment type box of the segment;
  include one or more self-contained movie fragments, wherein each self-contained movie fragment comprises a movie fragment ("moof") box and a media data ("mdat") box that contains media samples that do not use external data references referenced by a track in the movie fragment box;
  each of the moof boxes contains at least one track fragment;
  each of the moof boxes does not use external references;
  a "default-base-is-moof" flag of the media segment is set to true; and
  a "base-data-offset-present" flag of the media segment is set to false.

38. The non-transitory computer-readable storage medium of claim 36, wherein the random access media segment format indicates that corresponding segments:
  comprise random access segments, an ordinal first access unit in each movie fragment of the segments corresponds to an $I_{SAU}$ of a stream access point (SAP) of type 1, 2, or 3; and
  include all necessary information to access media data in a bitstream following the segments.

39. The non-transitory computer-readable storage medium of claim 36, wherein the random access media segment format indicates that corresponding segments include one or more segment index ("sidx") boxes, and wherein an ordinal first sidx box precedes all moof boxes of the media segment and describes the entire media segment.

40. The non-transitory computer-readable storage medium of claim 36, wherein the switching media segment format indicates that an odrinal first sample in an ordinal first movie fragment of the corresponding segments corresponds to an $I_{SAU}$ of a stream access point (SAP) or type 1 or 2.

* * * * *